(12) United States Patent
Alessandrini

(10) Patent No.: US 11,598,555 B2
(45) Date of Patent: Mar. 7, 2023

(54) HEAT EXCHANGER FOR A BOILER, AND HEAT-EXCHANGER TUBE

(71) Applicant: COSMOGAS S.r.l., Meldola (IT)

(72) Inventor: Alberto Alessandrini, Meldola (IT)

(73) Assignee: COSMOGAS S.R.L., Meldola (IT)

( * ) Notice: Subject to any disclaimer, the term of this patent is extended or adjusted under 35 U.S.C. 154(b) by 468 days.

(21) Appl. No.: 16/642,201

(22) PCT Filed: Aug. 7, 2018

(86) PCT No.: PCT/IB2018/055938
§ 371 (c)(1),
(2) Date: Feb. 26, 2020

(87) PCT Pub. No.: WO2019/043480
PCT Pub. Date: Mar. 7, 2019

(65) Prior Publication Data
US 2020/0355397 A1   Nov. 12, 2020

(30) Foreign Application Priority Data

Aug. 28, 2017   (IT) .......................... 102017000096656

(51) Int. Cl.
*F24H 1/43*   (2022.01)
*F24H 8/00*   (2022.01)
(Continued)

(52) U.S. Cl.
CPC ................. *F24H 1/43* (2013.01); *F24H 8/00* (2013.01); *F28D 7/04* (2013.01); *F28D 21/0007* (2013.01);
(Continued)

(58) Field of Classification Search
CPC ... F24H 1/43; F24H 1/40; F24H 1/403; F24H 1/208; F24H 2210/00; F28D 7/024;
(Continued)

(56) References Cited

U.S. PATENT DOCUMENTS

| | | | | |
|---|---|---|---|---|
| 1,840,940 A | * | 1/1932 | Ecabert | F25B 39/04 |
| | | | | 165/47 |
| 4,893,672 A | * | 1/1990 | Bader | F28D 7/024 |
| | | | | 165/95 |

(Continued)

FOREIGN PATENT DOCUMENTS

| | | | | |
|---|---|---|---|---|
| AT | 508158 A4 | * | 11/2010 | ............... F24H 1/43 |
| CH | 707113 A2 | * | 4/2014 | ......... F28D 20/0034 |

(Continued)

OTHER PUBLICATIONS

International Search Report and Written Opinion of the International Searching Authority for International Application No. PCT/IB2018/055938 dated Nov. 12, 2018.

*Primary Examiner* — Jenna M Hopkins
(74) *Attorney, Agent, or Firm* — Heslin Rothenberg Farley & Mesiti P.C.; Victor A. Cardona, Esq.

(57) ABSTRACT

A heat exchanger includes a plurality of tubes arranged in a juxtaposed configuration, and at least one first manifold member on the outside of the tubes. Each tube is wound to define a planar spiral, having a plurality of co-planar turns, and has an end portion, which extends starting from the inside of the corresponding planar spiral towards the outside thereof. The end portion is superimposed on the co-planar turns, in a position corresponding to a major face of the planar spiral, for connection to the manifold member. tube has a transverse depression defined in the co-planar turns at the major face of the planar spiral, and the transverse depression at least partially receives a a corresponding part of the end portion.

20 Claims, 20 Drawing Sheets

(51) Int. Cl.
  *F28D 7/04*   (2006.01)
  *F28D 21/00*  (2006.01)
  *F28F 1/02*   (2006.01)
  *F28F 9/00*   (2006.01)
(52) U.S. Cl.
  CPC .............. *F28F 1/025* (2013.01); *F28F 9/001* (2013.01); *F24H 2210/00* (2013.01); *F28F 2001/027* (2013.01); *F28F 2255/02* (2013.01)
(58) Field of Classification Search
  CPC ........ F28D 7/04; F28D 21/0007; F28F 1/025; F28F 1/04; F28F 1/045; F28F 2001/027; F28F 2240/00; F28F 2255/02
  See application file for complete search history.

(56) References Cited

U.S. PATENT DOCUMENTS

| | | | | |
|---|---|---|---|---|
| 5,171,144 | A * | 12/1992 | Gerstmann | F23D 14/36 431/328 |
| 6,052,898 | A * | 4/2000 | Corrigan | F28D 7/024 29/890.03 |
| 6,325,139 | B1 * | 12/2001 | Maruyama | F28D 7/024 165/145 |
| 2005/0120981 | A1 * | 6/2005 | Ferguson | F24H 1/40 122/367.3 |
| 2006/0196450 | A1 * | 9/2006 | Le Mer | F24H 1/43 122/18.1 |
| 2007/0099134 | A1 * | 5/2007 | Hamada | F23N 1/082 431/12 |
| 2015/0176862 | A1 * | 6/2015 | Kimura | F24H 1/43 122/18.4 |
| 2015/0176912 | A1 * | 6/2015 | Tsuji | B23P 15/26 29/890.03 |
| 2016/0091263 | A1 * | 3/2016 | Yamaji | F28D 21/0007 165/165 |
| 2016/0146541 | A1 * | 5/2016 | De Nardis | F24H 1/43 165/110 |
| 2017/0167753 | A1 * | 6/2017 | Russell | F24H 1/403 |
| 2019/0041092 | A1 * | 2/2019 | Niu | F24H 1/205 |

FOREIGN PATENT DOCUMENTS

| | | | | |
|---|---|---|---|---|
| CN | 102341651 | A * | 2/2012 | ............ F23D 14/62 |
| CN | 107062598 | A * | 8/2017 | ............... F24H 1/43 |
| DE | 19961638 | A1 * | 6/2000 | ............ B21D 11/06 |
| DE | 19961638 | A1 | 6/2000 | |
| DE | 102016215210 | A1 * | 2/2018 | |
| EP | 0061779 | A2 * | 3/1981 | |
| EP | 0168637 | A2 | 1/1986 | |
| EP | 1873465 | A1 * | 1/2008 | ............ F24H 1/403 |
| EP | 2549197 | A2 * | 1/2013 | ............... F24H 1/43 |
| EP | 3244135 | A1 * | 11/2017 | ............ F24H 1/208 |
| FR | 2854229 | A1 * | 10/2004 | ............... F24H 1/43 |
| FR | 2942866 | A1 | 9/2010 | |
| FR | 2942866 | A1 * | 9/2010 | ............ F23D 14/62 |
| FR | 3047063 | A1 * | 7/2017 | ............... F24H 1/40 |
| FR | 3054029 | A3 * | 1/2018 | ............... F24H 1/43 |
| JP | 2005030676 | A | 2/2005 | |
| KR | 200315193 | Y1 * | 6/2003 | ............... F24H 1/16 |
| KR | 100857001 | B1 * | 6/2007 | ............ F24H 1/403 |
| KR | 20110110080 | A * | 8/2011 | ............... F24H 1/40 |
| KR | 20170000813 | U * | 7/2017 | ............... F24H 1/43 |
| UA | 98821 | C2 * | 11/2007 | ............... F24H 1/00 |
| WO | WO-9514894 | A1 * | 6/1995 | ............... F24D 3/082 |
| WO | WO-0250480 | A1 * | 6/2002 | ............... F24H 1/30 |
| WO | WO-2004036121 | A1 * | 4/2004 | ............... F24H 1/43 |
| WO | 2005090900 | A2 | 9/2005 | |
| WO | WO-2005108876 | A1 * | 11/2005 | ............ F24H 1/165 |
| WO | 2006045153 | A1 | 5/2006 | |
| WO | WO-2007066369 | A1 * | 6/2007 | ............... F24H 1/43 |
| WO | WO-2010100004 | A1 * | 9/2010 | ............ F23D 14/62 |
| WO | 2013002644 | A1 | 1/2013 | |
| WO | WO-2015140713 | A1 * | 9/2015 | ............ B23P 15/26 |
| WO | WO-2019043480 | A1 * | 3/2019 | ............... F24H 1/43 |

\* cited by examiner

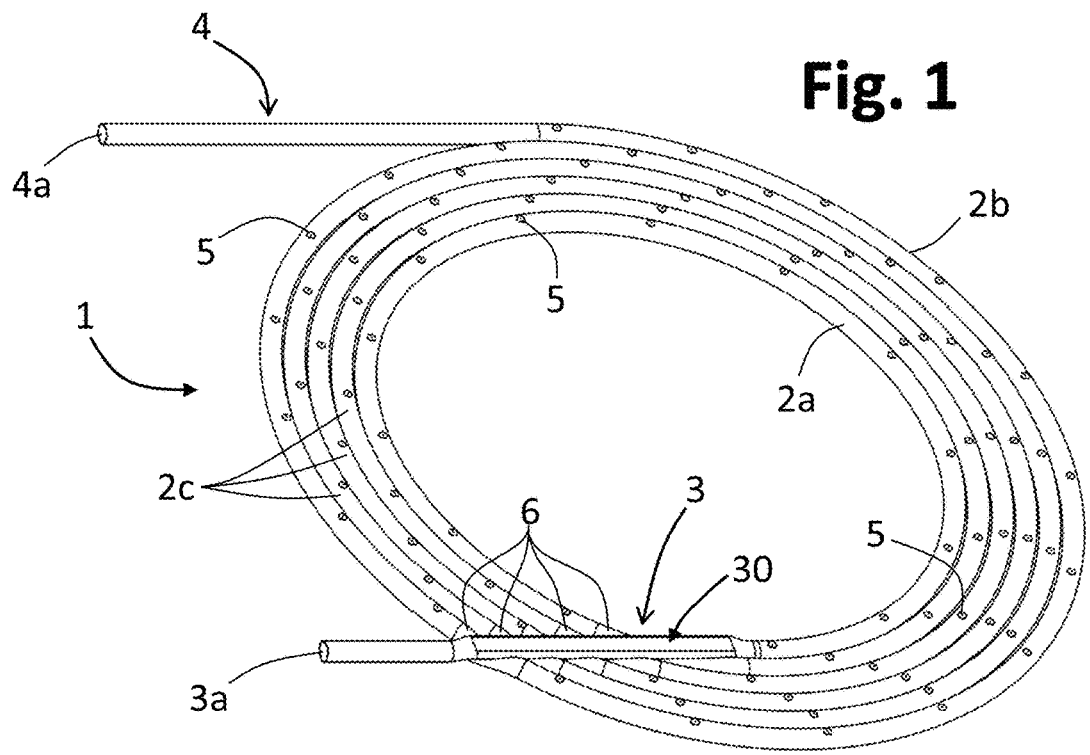
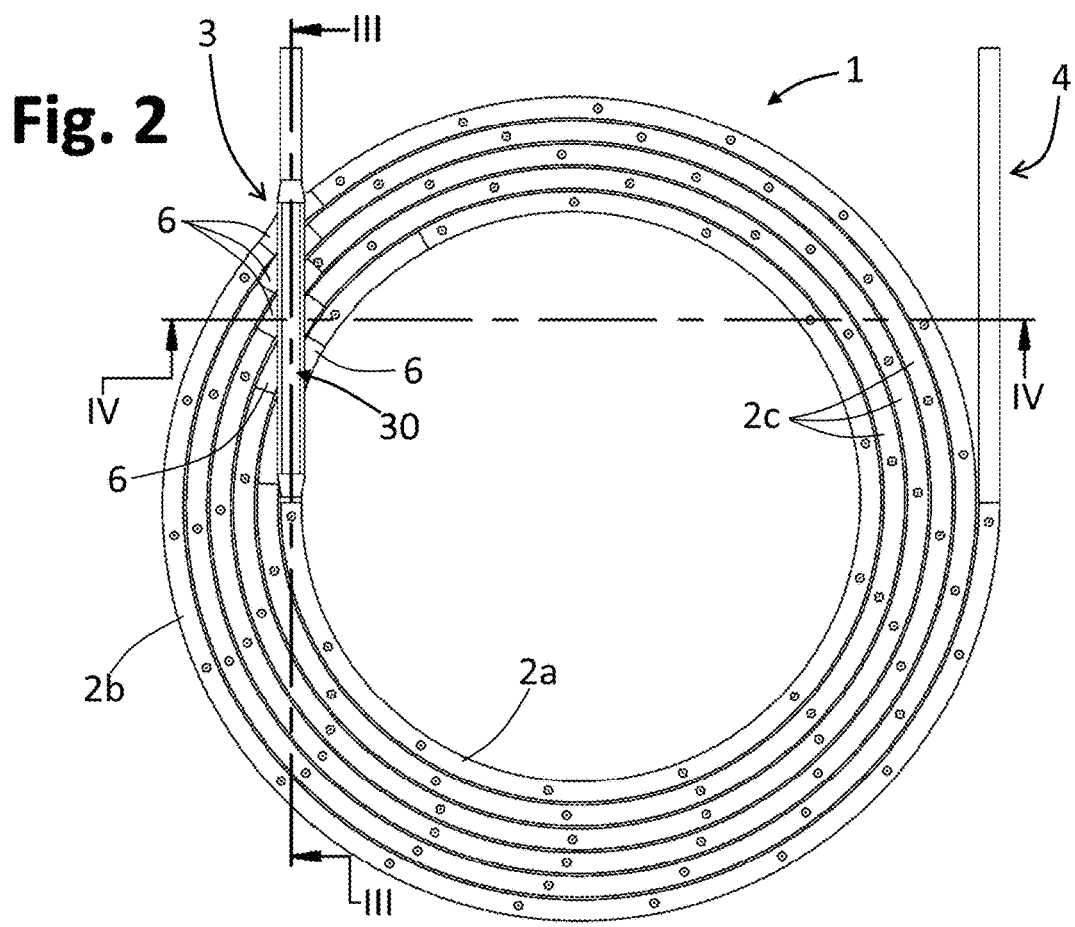

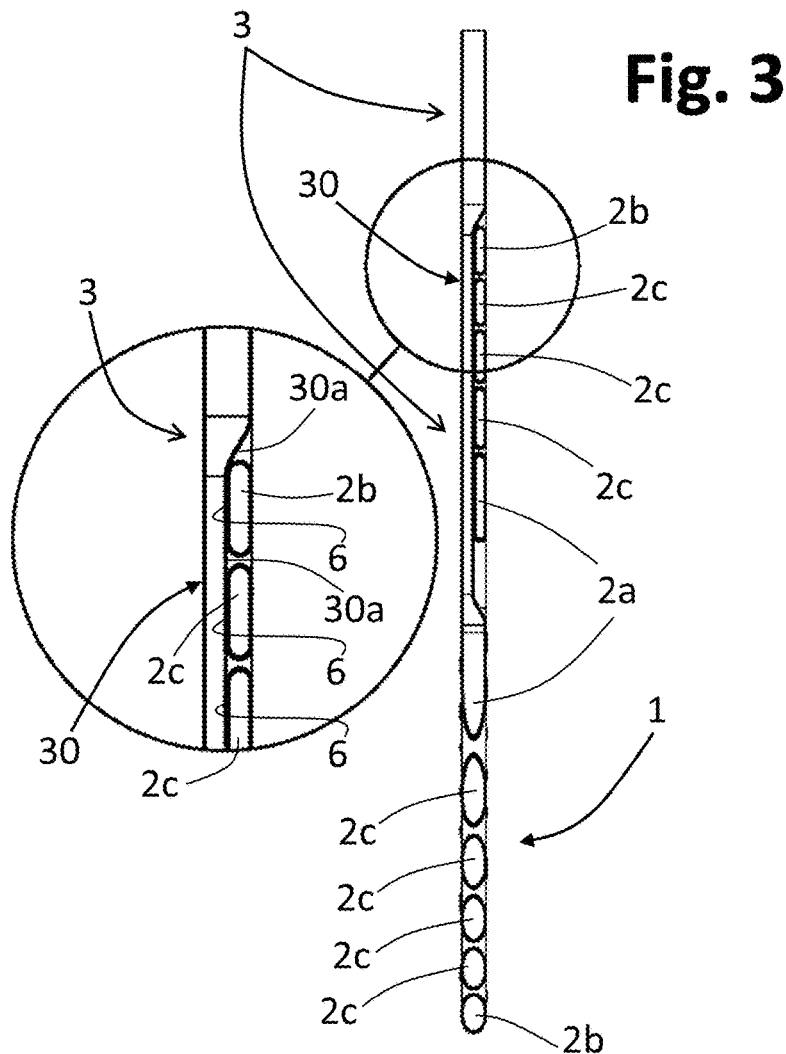
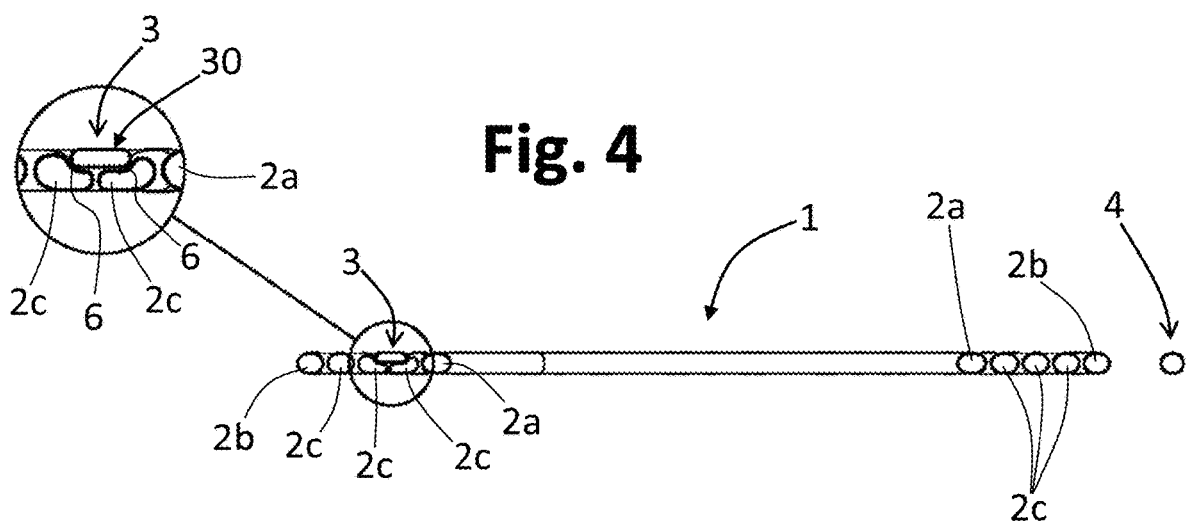

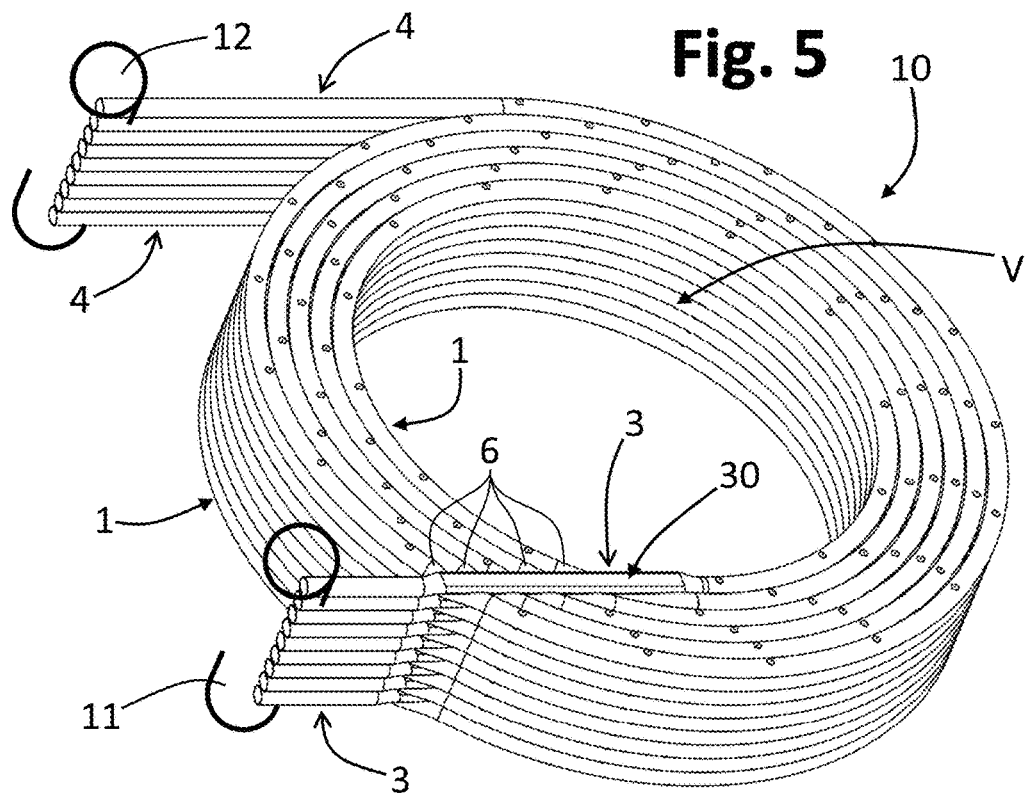

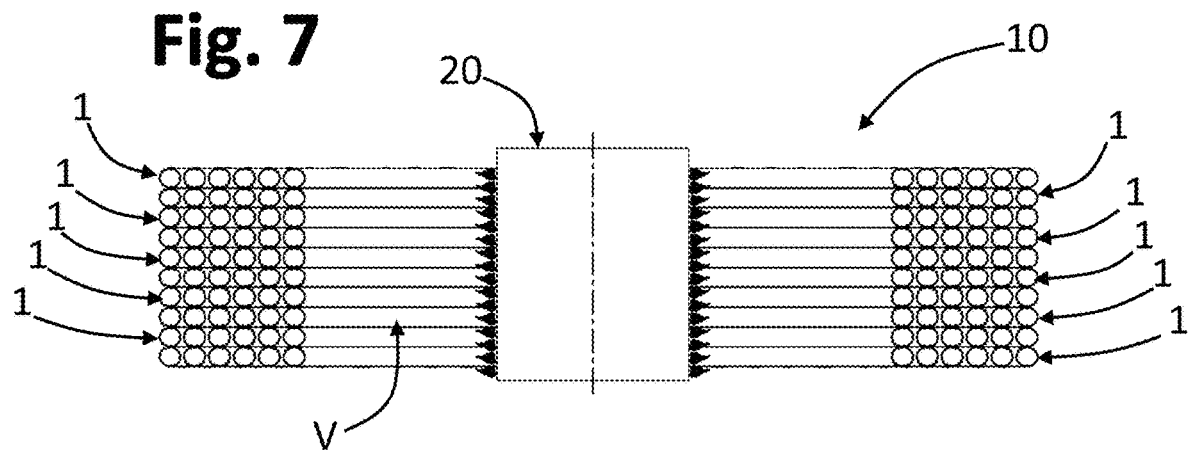
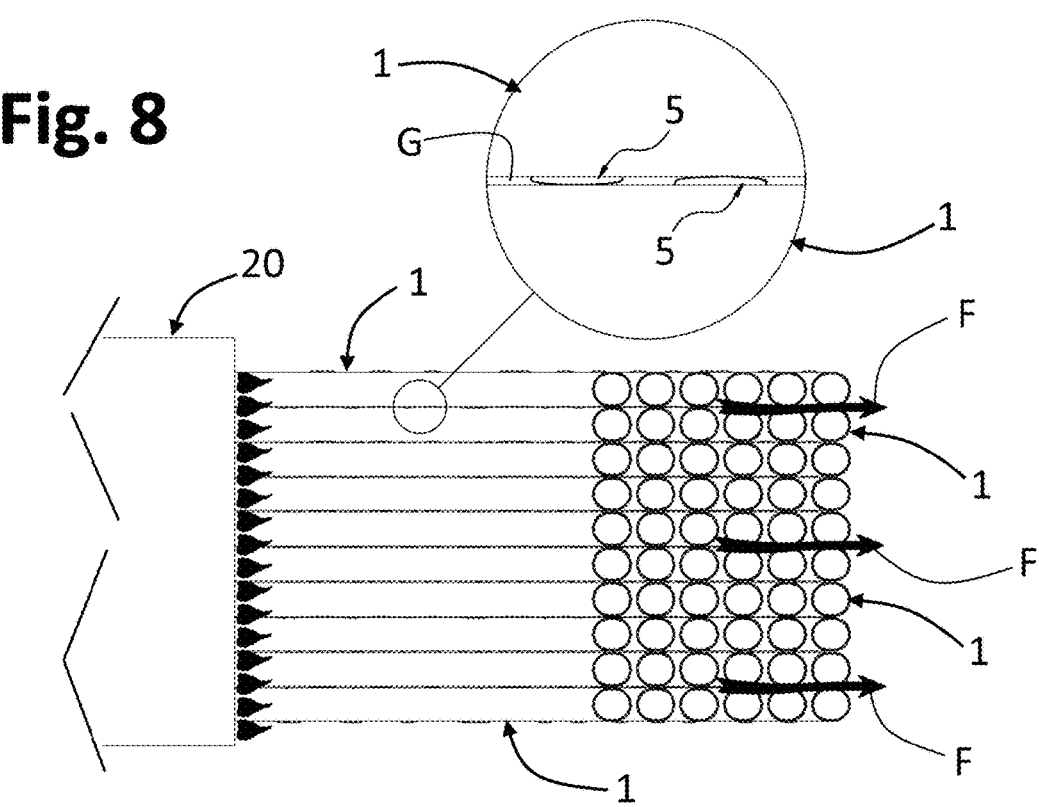

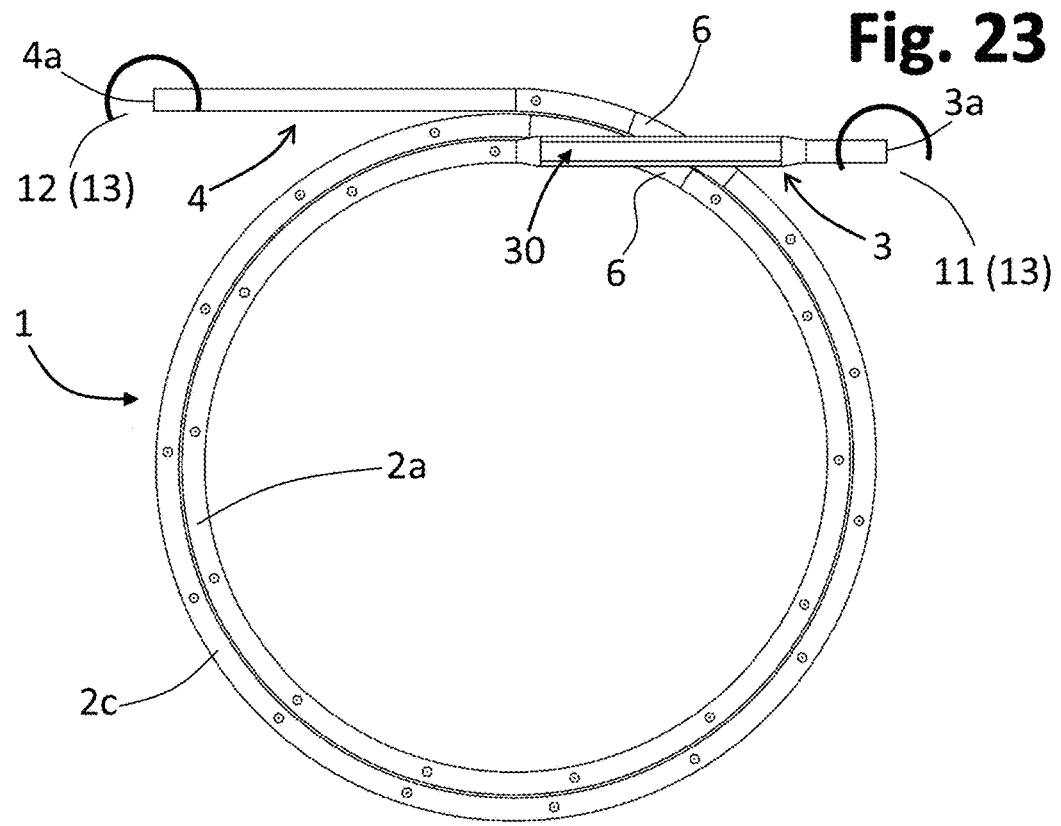
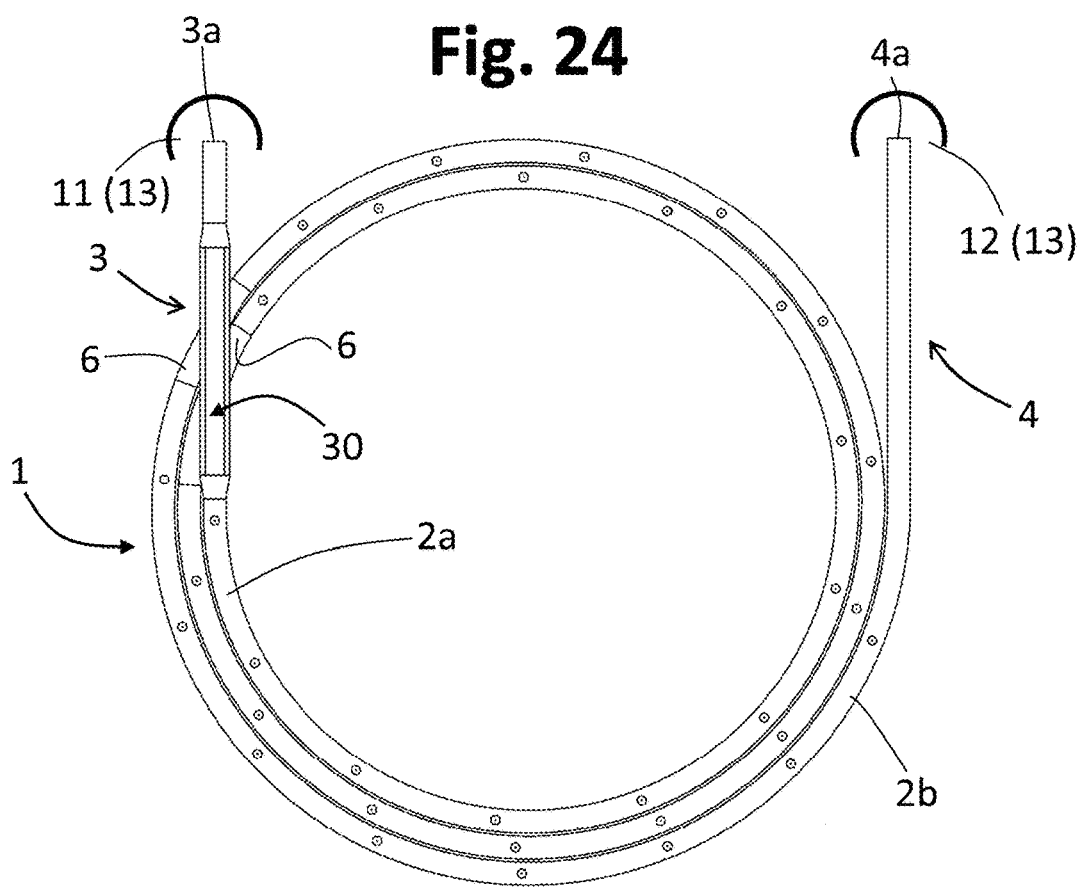

HEAT EXCHANGER FOR A BOILER, AND HEAT-EXCHANGER TUBE

CROSS REFERENCE TO RELATED APPLICATIONS

This application is a national stage filing under section 371 of International Application PCT/IB2018/055938, filed on Aug. 7, 2018, published in English on Mar. 7, 2019 as WO 2019/043480 A1, and claims priority to Italian Patent Application No. 102017000096656, filed on Aug. 28, 2017. The entire disclosures of each application are hereby incorporated herein by reference.

FIELD OF THE INVENTION

The present invention relates to heat exchangers for boilers and heating devices in general, and has been developed with particular reference to the production of tubes and tube assemblies for such heat exchangers, in particular condensation heat exchangers.

PRIOR ART

The function of a heat exchanger is to transfer thermal energy between two fluids. For example, in the case of domestic gas boilers, the function of the heat exchanger is to heat water circulating inside it, starting from the hot fumes that result from the combustion produced via a burner. In more traditional boilers, the heat exchanger is conceived for exploiting substantially only the heat that develops following upon combustion of the gas, whereas heat exchangers for condensation boilers also exploit the latent heat of condensation contained in the combustion fumes.

In order to recover the heat contained in the fumes, the heat exchanger in general comprises a casing, defined in which is a path for circulation of the water, against which the fumes are made to flow. To obtain a sufficient exchange between the fluids flowing inside and outside of the path of the heat exchanger it is necessary to have a heat-exchange surface that is as extensive as possible. For this purpose, in various known solutions, the aforesaid water-circulation path includes a tube wound in a helix, or a plurality of tubes wound in a helix arranged substantially concentrically, the innermost tube of the plurality surrounding the burner. In a first type of solutions, the tube assembly comprises a number of helical tubes arranged concentrically that operate in parallel; i.e., they each extend between an inlet chamber and an outlet chamber of the heat exchanger, which are provided at the two axial ends of the corresponding casing. In a second type of solutions, the tube assembly comprises a number of helical tubes arranged concentrically, which are connected in series, via substantially U-shaped connectors, so that the water enters the heat exchanger from the inlet of the first tube of the series and exits from the heat exchanger through the outlet of the last tube of the series.

Known heat exchangers with tubes wound in a helix are in general far from flexible from the production standpoint given that production of boilers that have different thermal powers presupposes pre-arrangement of helical tubes with different axial dimensions. As has been said, in fact, the thermal power of a heat exchanger depends, among other things, upon the heat-exchange surface so that, in general, heat exchangers conceived for different thermal powers must differ from one another as regards the number of volutes of the various tubes, and hence as regards the axial dimensions of the corresponding helices.

There have also been proposed heat exchangers, the tube assembly of which is obtained by juxtaposing or stacking a plurality of tubes, each wound to define a substantially plane spiral. In these solutions, the two end portions of each tube are in general connected to a delivery manifold and to a return manifold, respectively, with a connection in parallel of the tubes themselves. A first end portion of the tube hence extends from the innermost turn of the spiral, whereas the other end portion extends completely on the outside of the spiral, starting from the outermost turn.

With solutions of this type the tube assembly has a substantially modular structure, thereby enabling composition in a simple way of tube assemblies of different height, and hence of different power.

In these tube assemblies, the aforesaid first end portion is partially superimposed on the spiral of the corresponding tube, on a major face of the spiral. In this way, between the various tubes stacked on top of one another there must be provided gaps, the height of which is sufficient to enable passage of the aforesaid first end portion of each tube, towards the outside of the spiral. These gaps are hence relatively wide, and this reduces the efficiency of heat exchange with the fumes. In addition to this, the heat exchanger must be equipped with purposely provided additional spacer components, aimed at maintaining the various juxtaposed tubes at the right distance.

There have also been proposed tube assemblies in which a plurality of tubes that each define a substantially plane spiral are arranged adjacent to one another so as to define sufficiently narrow gaps between the tubes themselves, to the advantage of efficiency of the heat exchanger. Also in these solutions the heat exchanger is in general equipped with purposely provided additional spacers. In these solutions, the manifold to which the first end portion of each tube is to be connected must extend axially within the assembly itself, i.e., within the innermost spiral of each of the juxtaposed tubes. This positioning complicates construction of the heat exchanger and can have an adverse effect on its operation, given that the aforementioned manifold comes to occupy a position close to the gas burner. Alternatively, the first end portions of each tube can be shaped, via bending, to extend themselves in the axial direction of the tube assembly, in order to project from the latter at one of its two axial ends, for connection to a manifold positioned externally. Also this type of solutions complicates, however, production of the tube assembly, in particular on account of the fact that the various tubes (and especially their first end portions), must be shaped differently from one another.

SUMMARY OF THE INVENTION

With a view to what has been set forth above, the aim of the present invention is basically to solve the drawbacks referred to above and provide a heat exchanger presenting efficient operation, of compact dimensions, simple and economically advantageous to manufacture, and distinguished by a high flexibility of production. With a view to achieving this aim, the object of the invention are a heat exchanger, in particular of the condensation type, and a heat-exchanger tube that present the characteristics referred to in the attached claims. The claims form an integral part of the technical teaching provided herein in relation to the invention.

BRIEF DESCRIPTION OF THE DRAWINGS

Further objects, characteristics, and advantages of the invention will emerge from the ensuing description, with reference to the annexed drawings, which are provided purely by way of non-limiting example and in which:

FIG. 1 is a schematic perspective view of a heat-exchanger tube according to possible embodiments of the invention;

FIG. 2 is a schematic top plan view of a heat-exchanger tube according to possible embodiments of the invention;

FIG. 3 is a schematic cross-sectional view according to the line III-III of FIG. 2, with a corresponding enlarged detail;

FIG. 4 is a schematic cross-sectional view according to the line IV-IV of FIG. 2, with a corresponding enlarged detail;

FIG. 5 is a schematic perspective view of a tube assembly comprising a plurality of tubes according to possible embodiments of the invention;

FIG. 6 is a schematic top plan view of a tube assembly comprising a plurality of tubes according to possible embodiments of the invention, with a corresponding burner;

FIG. 7 is a schematic cross-sectional view according to the line VII-VII of FIG. 6;

FIG. 8 is a portion at a larger scale of FIG. 7, with a corresponding enlarged detail;

FIGS. 21, 22, 23, 24, and 25 are schematic top plan views of heat-exchanger tubes according to further possible embodiments of the invention;

DESCRIPTION OF PREFERRED EMBODIMENTS OF THE INVENTION

Figure 9:
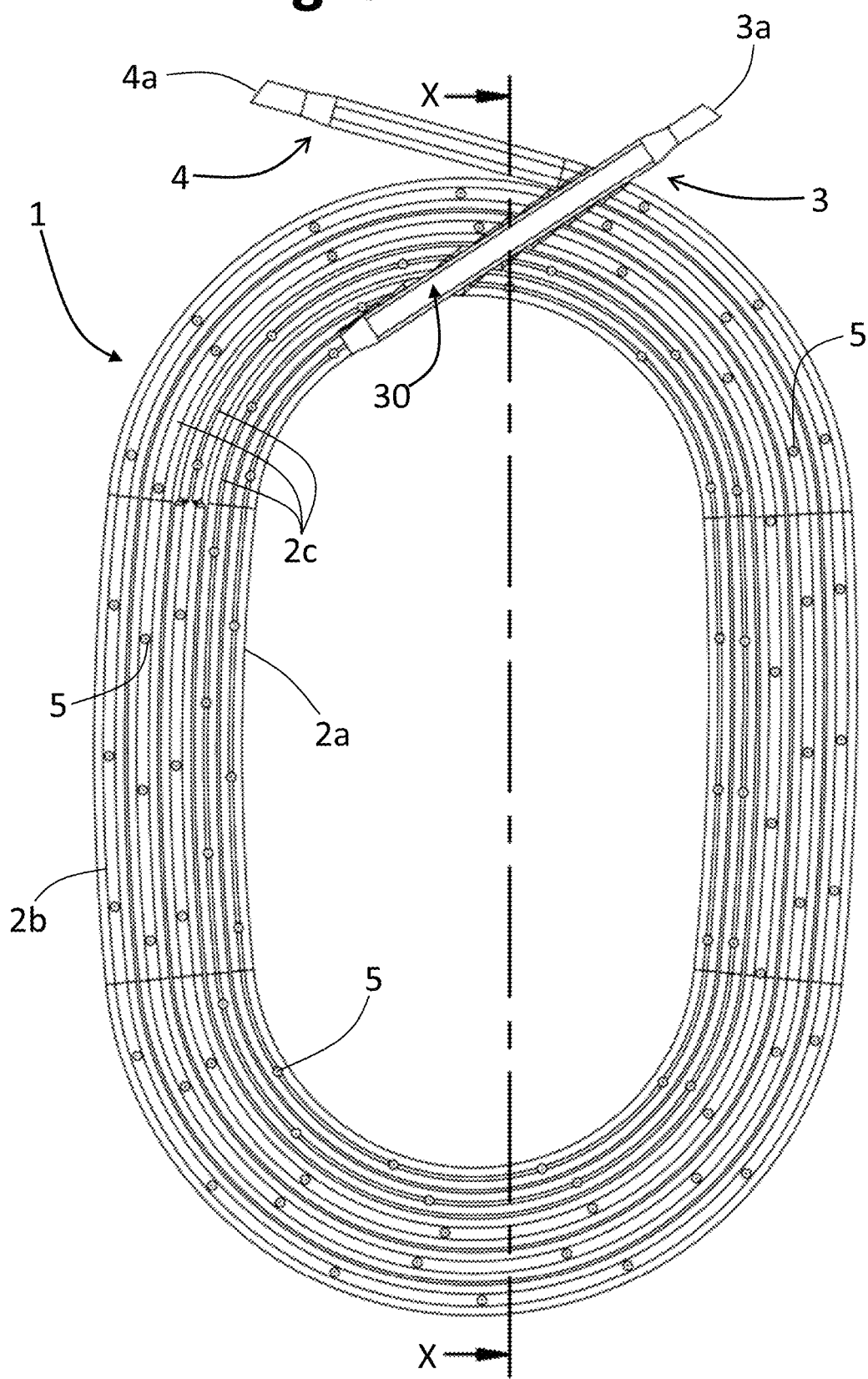
FIG. 9 is a schematic top plan view of a tube assembly comprising a plurality of tubes according to further possible embodiments of the invention.

Reference to "an embodiment" or "one embodiment" and the like, within the framework of the present description is intended to indicate that at least one particular configuration, structure, or characteristic described in relation to the embodiment is comprised in at least one embodiment. Hence, phrases such as "in an embodiment", "in one embodiment", "in various embodiments", and the like, that may be present in various points of this description do not necessarily refer to one and the same embodiment, but may instead refer to different embodiments. Moreover, particular conformations, structures, or characteristics defined within this description may be combined in any adequate way in one or more embodiments, even different from the ones represented. The reference numbers and spatial references (such as "upper", "lower", "up", "down", "front", "back", "vertical", etc.) used herein, in particular with reference to the examples in the figures, are only provided for convenience and hence do not define the sphere of protection or the scope of the embodiments. In the present description and in the attached claims, the generic term "material" is to be understood as comprising also mixtures, compositions, or alloys of a number of different materials.

In the framework of the present description and the attached claims, and where not otherwise specified, the term "turn" is understood as indicating the part of a spiral, in particular of a substantially plane spiral, described during a complete or practically complete turn around the pole or axis of the spiral. In the figures the same reference numbers are used to designate elements that are similar or technically equivalent to one another.

With initial reference to FIGS. 1 and 2, designated as a whole by 1 is a heat-exchanger pipe or tube, in particular for a boiler, obtained according to possible embodiments of the invention. The tube 1, which may conveniently be made of metal material, for example stainless steel, has a preferentially substantially circular cross section, except for some of its portions described hereinafter.

The tube 1 is wound so as to define a substantially plane spiral, having at least one complete turn. In various embodiments, such as the one exemplified in FIGS. 1 and 2, the tube 1 defines a spiral that comprises a plurality of substantially co-planar turns, amongst which an inner turn, designated by 2a, and at least one further turn around the inner turn 2a. Once again with reference to the case exemplified in the figures, the at least one further turn includes an outer turn, designated by 2b, and a plurality of intermediate turns, designated by 2c. In various embodiments, such as the one exemplified, the turn or turns are substantially circular.

The tube 1 has a first end portion 3, preferably but not necessarily substantially rectilinear, which extends from the inside of the corresponding spiral towards the outside thereof. In the case exemplified, the end portion 3 hence extends from the inner turn 2a of the spiral. The end portion 3 extends so as to be at least in part superimposed on the turns 2a, 2b, 2c, at a major face of the spiral, i.e., the face visible in FIGS. 1 and 2, which is here conventionally defined as "upper face" for simplicity of description. As will emerge clearly hereinafter, the end portion 3 is preferably designed for connection to a corresponding manifold member.

The tube 1 also has a second end portion 4, preferably but not necessarily substantially rectilinear, which extends on the outside of the corresponding spiral, in particular completely on the outside. In the non-limiting example illustrated, the end portion 4 hence extends from the outer spiral 2*b*. As will emerge clearly hereinafter, also the end portion 4 is preferably designed for connection to a corresponding manifold member. In various embodiments, the end portions 3 and 4 of the tube 1 extend substantially parallel to one another, with the ends 3*a* and 4*a* facing in one and the same direction, even though this does not constitute an essential characteristic.

According to the invention, the tube 1 has at least one transverse depression that is defined in the at least one turn of the corresponding spiral, and in the at least one transverse depression a corresponding part of the first end portion 3 is at least partially received.

In various embodiments, in which the spiral comprises a plurality of substantially co-planar turns, the tube has a plurality of the aforesaid transverse depressions, each defined in a respective turn of the plurality of turns, at the aforesaid major face of the spiral, and these transverse depressions are in positions substantially aligned with one another, according to a direction of extension of the first end portion 3, thus forming a sort of seat in which the first end portion 3 itself is at least partially received.

With reference to the example illustrated in FIGS. 1 and 2, the aforesaid transverse depressions are designated by 6 and are defined in the inner turn 2*a*, intermediate turns 2*c*, and outer turn 2*b*. The depressions 6 are obtained by means of respective local deformations of the tube 1, each at a respective turn.

As may be seen in particular in the sectional views of FIGS. 3 and 4, at the aforesaid local deformations, i.e., at the corresponding depressions 6, the tube 1 has a profile at least in part substantially flattened or planed, with respect to its prevalent profile, which, as has been said, in the example is substantially circular. It should be noted that the local deformation is obtained so as not to determine a substantial reduction of the section of passage for the heat-carrier fluid that circulates in the tube 1.

In various preferential embodiments, the first end portion 3 of the tube 1 comprises at least one stretch of tube, which also has a substantially flattened or squashed profile, with respect to the prevalent profile of the tube itself, at least in an area corresponding to the depression or depressions 6 provided in each turn. Also this characteristic may be clearly appreciated in FIGS. 3 and 4, where the aforesaid stretch of tube is designated by 30. Also the substantially flattened profile of the stretch 30 is obtained by a local deformation of the tube 1 that has a length at least equal to the part of the end portion 3 that is superimposed on the spiral. Also this local deformation hence substantially comprises a transverse depression of the tube 1 at the stretch 30, this depression being designated by 30*a* in FIG. 3. Also this local deformation of the tube 1 is obtained so as not to determine a substantial reduction of the section of passage for the heat-carrier fluid. In preferred embodiments, the depressions 6 and 30*a* imply a flattening of the tube 1 that is approximately one half of the height of its cross section, thereby making it possible to maintain as a whole the original height of the cross section of the tube 1.

The depressions 6 and/or 30*a* may be formed by locally deforming or pressing the tube, even after it has been wound in a spiral. For instance, a possible method to obtain a tube 1 envisages that, after it has been wound in a spiral, a removable supporting core is inserted into the end portion 3 (if so required, having a profile adequate for obtaining the depression 30*a*), and the tube is then squeezed locally, for example with a press or the like, by pressing at least part of the end portion 30 containing the supporting core on the underlying turn or turns of the tube 1 itself so as to define the depression or depressions 6 (with the same operation, also the depression 30*a* can, if need be, be defined in the portion 30); the core is then extracted from the portion 3.

In various embodiments, the deformed stretch 30 is an intermediate stretch of the end portion 3, or in any case such that the corresponding end 3*a* (FIG. 1) of the tube 1 will maintain the initial cross section, here substantially circular. In other embodiments, the entire portion 30 or substantially the entire portion 30 is deformed or pressed so that it assumes the aforesaid substantially flattened profile. The second end portion 4 does not necessarily require any pressing, hence having the initial or prevalent circular cross section of the tube 1.

As may be appreciated, the presence of the depressions 3*a* and 6 enables the tube 1 to maintain a height—understood as distance of encumbrance between the two major faces of the corresponding spiral—that is substantially constant, even in the area in which the end portion 3 is superimposed on the turns. As will emerge clearly hereinafter, this peculiarity makes it possible to set a number of tubes 1 on top of one another in positions very close to one another.

FIGS. 5 and 6 are schematic illustrations of a tube bundle or assembly 10 for a heat exchanger, obtained by juxtaposing or stacking a plurality of tubes according to the invention, which are preferably the same as one another. In the case exemplified, each tube 1 (apart from the lowest tube of the assembly 10) is juxtaposed with respect to another tube 1 at the second major face of the corresponding spiral, here conventionally defined as "lower face". As may be noted, the inner turns 2*a* of the various tubes 1 stacked on top of one another substantially delimit an axial hollow volume, here substantially cylindrical, designated by V.

Moreover represented schematically in FIG. 5 are two manifold members, designated by 11 and 12, connected in parallel to which are the end portions 3 and 4, respectively, of the various tubes 1 of the assembly 10. The manifold 11 may be assumed to be a delivery manifold for the hot water of a heating system, this water being heated via circulation in the tubes 1, and the manifold 12 may be assumed to be a return manifold for the cold water from the aforesaid system.

In various embodiments, such as the one represented, the end portions 3 of the tubes 1 of the assembly 10 are in superimposed positions, for the purposes of connection to the manifold 11, and the end portions 4 are in superimposed positions, for the purposes of connection to the manifold 12. This does not constitute, however, an essential characteristic since, in other embodiments, at least some of the tubes 1 of one and the same assembly 10 may have the portions 3 and/or 4 oriented differently with respect to another.

In FIGS. 7 and 8, where the various juxtaposed tubes 1 are visible, the compactness of the assembly 10 may be appreciated, with the series of turns that develop in a direction substantially orthogonal to the burner designated by 20, which here extends within the axial hollow volume V. The combustion fumes are free to flow through the gaps or passageways defined between the juxtaposed tubes 1, lapping the various turns of each tube 1 and hence transferring heat to the water or other fluid to be heated.

In various embodiments, spacer means are provided to keep the turns of one tube 1 at a distance from those of the adjacent tube 1 or tubes 1, where this distance defines the aforesaid gaps or passageways. The aforesaid distance may be substantially constant along the tube 1, or else may be greater at one or more turns that are closer to the burner 20—i.e., in the that area in which the fumes are more voluminous—and then decrease at the remaining outermost turns, where the fumes lose volume.

In preferential embodiments, the aforesaid spacer means are themselves defined via local deformations of each tube 1; i.e., each tube 1 has an outer profile shaped for defining parts substantially in relief, at at least one of the two major faces of the corresponding spiral. The aforesaid parts in relief, designated by 5 in the figures, may for example be in the form of small projecting bumps, or else the tube 1 may be locally ovalised, with the major axis of the ovalised cross section that is substantially parallel to the axis of the respective spiral, for example according to what is described in WO 2005/080900 filed in the name of the present applicant.

As may be appreciated in particular from the detail of FIG. 8, the parts in relief of one tube 1 are in this way in contact with another tube 1 of the plurality of tubes, thus defining between the tubes themselves the gap or passageway—designated by G—for the heat-exchange fluid represented by the combustion fumes, designated by F in FIG. 8. The substantially laminar flows of the fumes F that traverse the passageways G in a substantially radial direction, lap the turns of the tubes 1, transferring their heat, and hence heating the water that circulates in the tubes themselves.

According to other embodiments, spacer means of some other type may be used, according to known technique, applied to the tubes 1 or between them.

Represented in FIG. 9 is a possible variant embodiment, according to which the tube 1 is wound so as to define a spiral, the turns of which are approximately elliptical or more precisely distinguished by two substantially parallel stretches of tube connected to one another by two arched stretches of tube. Apart from the different shape of the turns 2a-2c, the tube 1 of FIG. 9 implements the same concepts already set forth previously, and hence with local deformations that form transverse depressions 6 in the various turns, and a transverse depression 30a at the stretch 30 of the end portion 3, as is clearly visible in FIG. 10.

Figure 10:
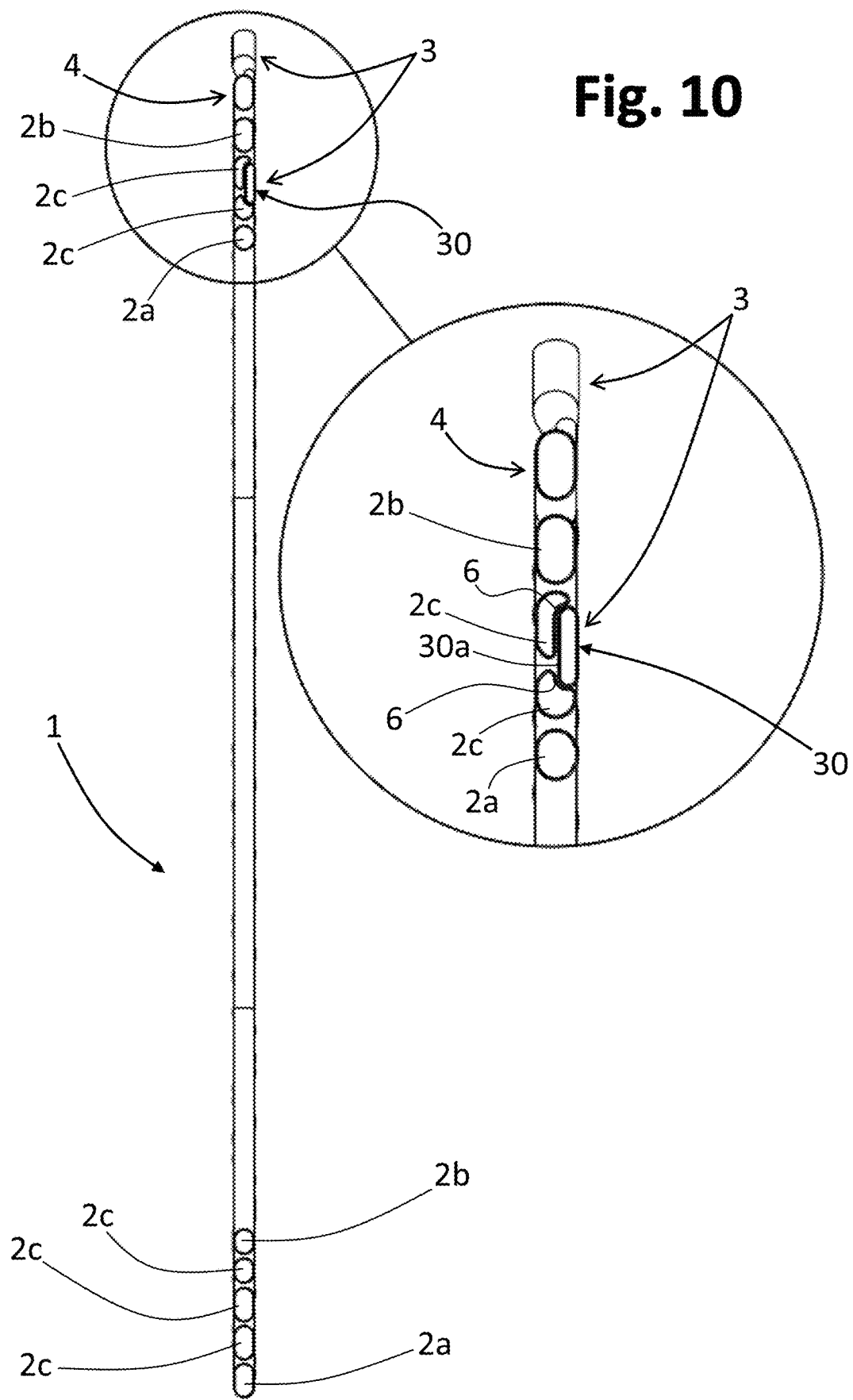
FIG. 10 is a schematic cross-sectional view according to the line X-X of FIG. 9, with a corresponding enlarged detail.
Figure 11:
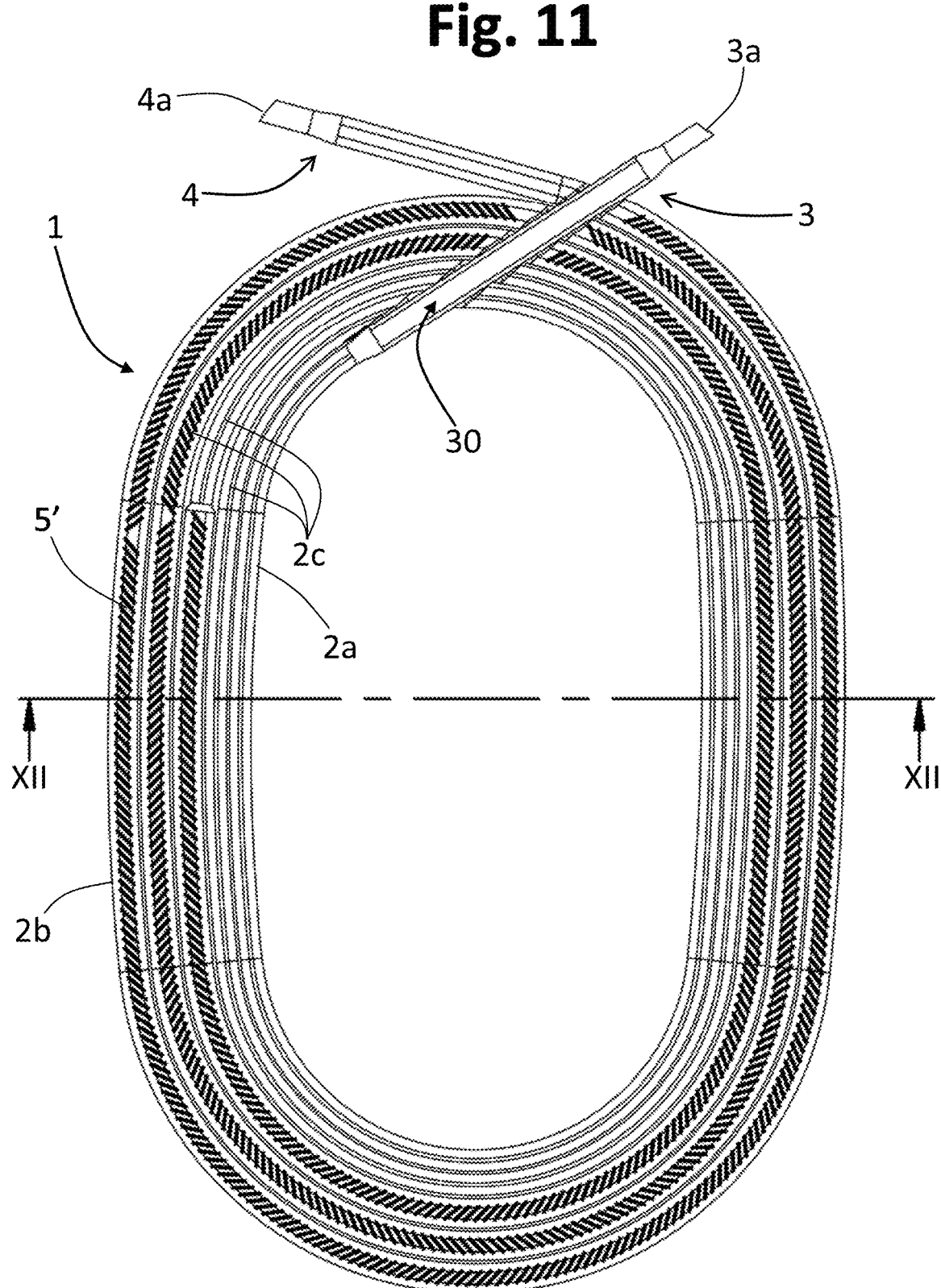
FIG. 11 is a schematic top plan view of a tube assembly comprising a plurality of tubes according to further possible embodiments of the invention.
Figure 12:
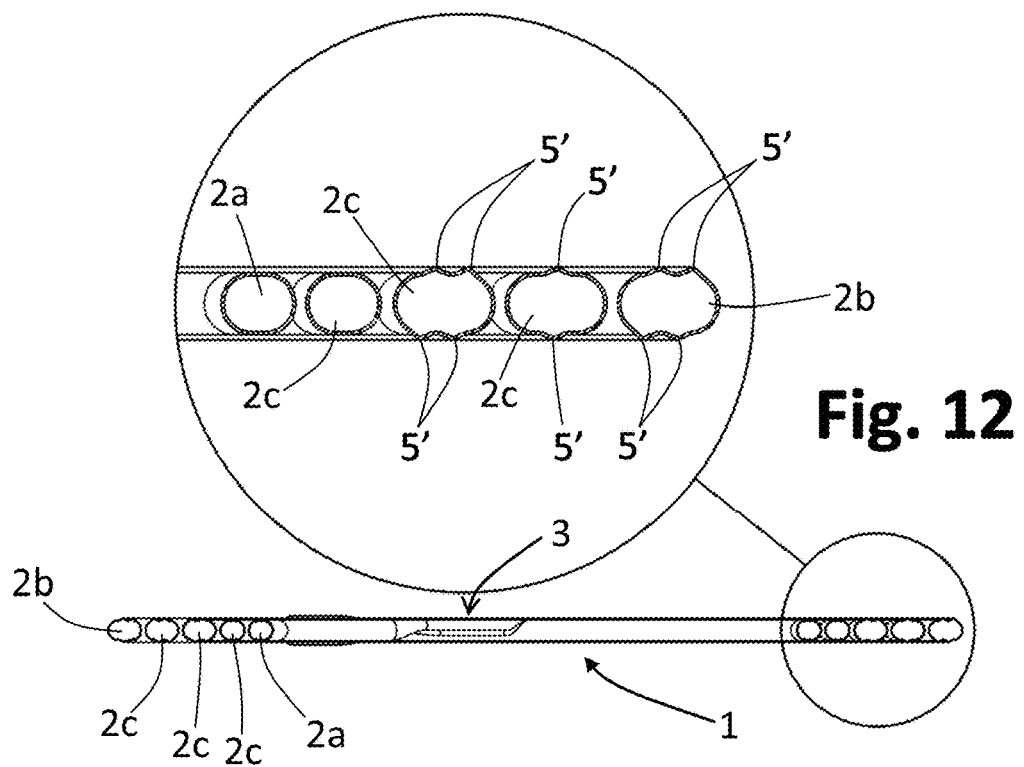
FIG. 12 is a schematic cross-sectional view according to the line XII-XII of FIG. 11, with a corresponding enlarged detail.

FIGS. 11 and 12 refer to possible variant embodiments in which the outer profile of the tubes 1 is shaped for defining transverse parts in relief 5', aimed at providing the spacer means that define the gaps or passageways between the superimposed tubes. In embodiments of this type, as in the case of the embodiments of FIGS. 9-10, the tube 1 may have a substantially ovalised starting or nominal section, i.e., with a dimension of width greater than the dimension of height, the other characteristics referred to above remaining the same.

In various embodiments, in a heat exchanger according to the invention, a tube assembly of the type described herein is housed within a heat-exchanger casing, associated to which is a gas burner (or else some other heat source) and which has an outlet for the fumes produced by the burner. In this way, the heat-exchanger casing confines the fumes inside it, forcing them to follow a certain path between the burner and the aforesaid outlet so as to lap the tubes. The burner preferentially faces or projects towards the inside of an axial hollow volume defined by the inner turns of the various tubes stacked on top of one another; it is also possible to use burners that extend axially substantially for the entire height of the aforesaid hollow volume (for example, as represented schematically in FIG. 7).

The burner and the fume outlet may be provided at one and the same end of the heat-exchanger casing, or else at ends generally opposite to one another. The fume outlet may also be provided at a peripheral shell or wall of the heat-exchanger casing. The heat exchanger preferentially integrates at least one delivery manifold member and one return manifold member for the heat-carrier fluid that circulates in the tubes of the assembly, these manifold members possibly being on the outside of the heat-exchanger casing.

In various embodiments, in the case where the burner and the fume outlet are set at opposite ends of the heat-exchanger casing, the outlet can face the aforesaid hollow volume defined by the inner turns of the various tubes stacked on top of one another. In various embodiments of this type, within the tube assembly there may be provided an intermediate barrier, preferably configured for forcing the fumes produced by the burner to follow a tortuous path, in particular first from the inside towards the outside of the assembly and then from the outside towards the inside of the assembly, as far as the fume outlet.

Figure 13:
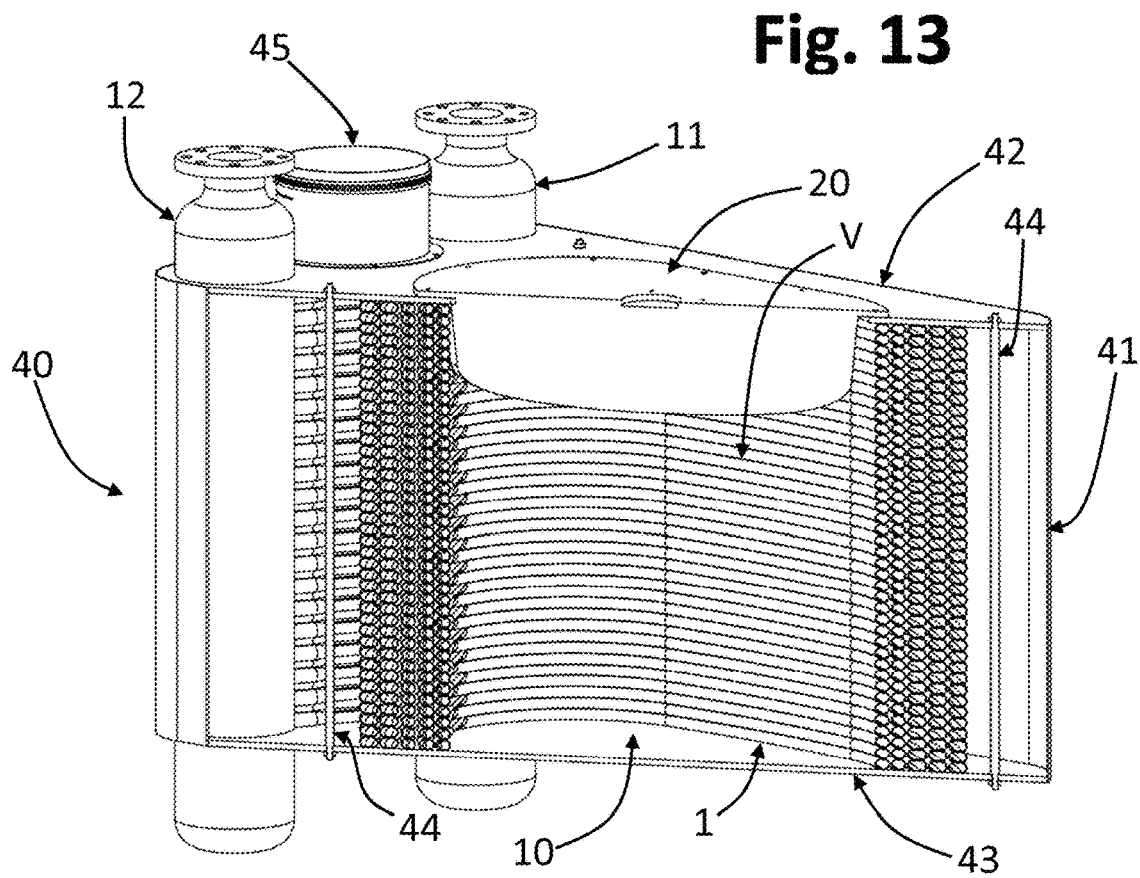
FIG. 13 is a sectioned perspective view of a heat exchanger according to possible embodiments of the present invention.

FIG. 13 is a schematic illustration of a heat exchanger of a boiler or similar heating device, provided with a tube assembly 10 formed by a plurality of juxtaposed tubes 1 according to FIGS. 9-10 (or according to FIGS. 11-12).

The heat exchanger, designated as a whole by 40, has a casing of its own that preferentially comprises a peripheral shell or wall 41, closed at two opposite ends by respective end plates 42 and 43. In various embodiments these plates 42 and 43—here conventionally defined as "upper plate" and "lower plate", respectively—are connected to one another by means of tie-rods 44 that extend in the direction of the axis or pole of the spiral of each tube 1, preferably on the outside of the tube assembly 10.

Figure 14:
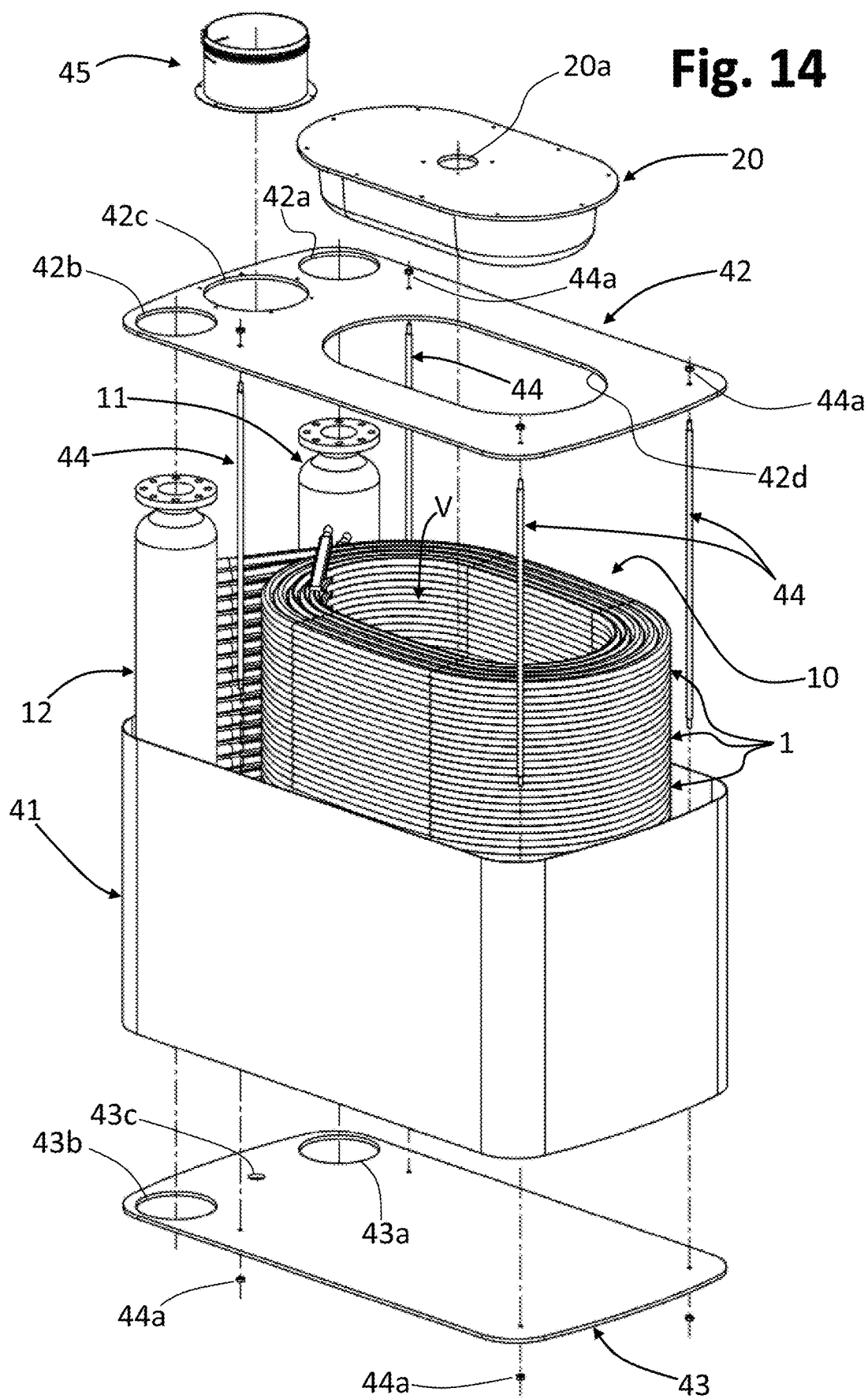
FIG. 14 is an exploded view of the heat exchanger of FIG. 13.

As may be seen also in FIG. 14, the various tubes 1 are connected to respective manifold members 11 and 12, which are at least partially housed in the casing of the heat exchanger 40. In the case exemplified, the plates 42 and 43 have respective holes or passages 42a, 42b and 43a, 43b, through which the manifold members 11 and 12 extend. The upper plate 42 likewise has a further outlet hole or passage 42c, where an exhaust connector 45 is provided for the fumes that are to flow away from the assembly 10. The upper plate 42 likewise has an opening 42d for installation of a burner 20, which, when it is installed, comes to face the hollow volume V defined by the inner turns of the tubes 1 stacked on top of one another. In the example, the burner 20 has a corresponding inlet 20a for an air-gas supply mixture, indicated by the arrow AG in FIG. 16.

The lower plate 43 preferentially has an outlet passage 43c for discharge of possible condensation water that forms within the casing. As represented schematically in FIG. 16, a respective discharge connector 46 may be associated to this passage 43c.

Once again visible in FIG. 14 are the tie-rods 44, for example four tie-rods, which are used for connecting the plates 42 and 43 together and packing between them the shell 41 and the tube assembly 10. In the example, the tie-rods 44 have threaded ends, inserted in and passing through respective holes provided in the plates 42 and 43, for being fixed via respective nuts 44a.

Figure 15:
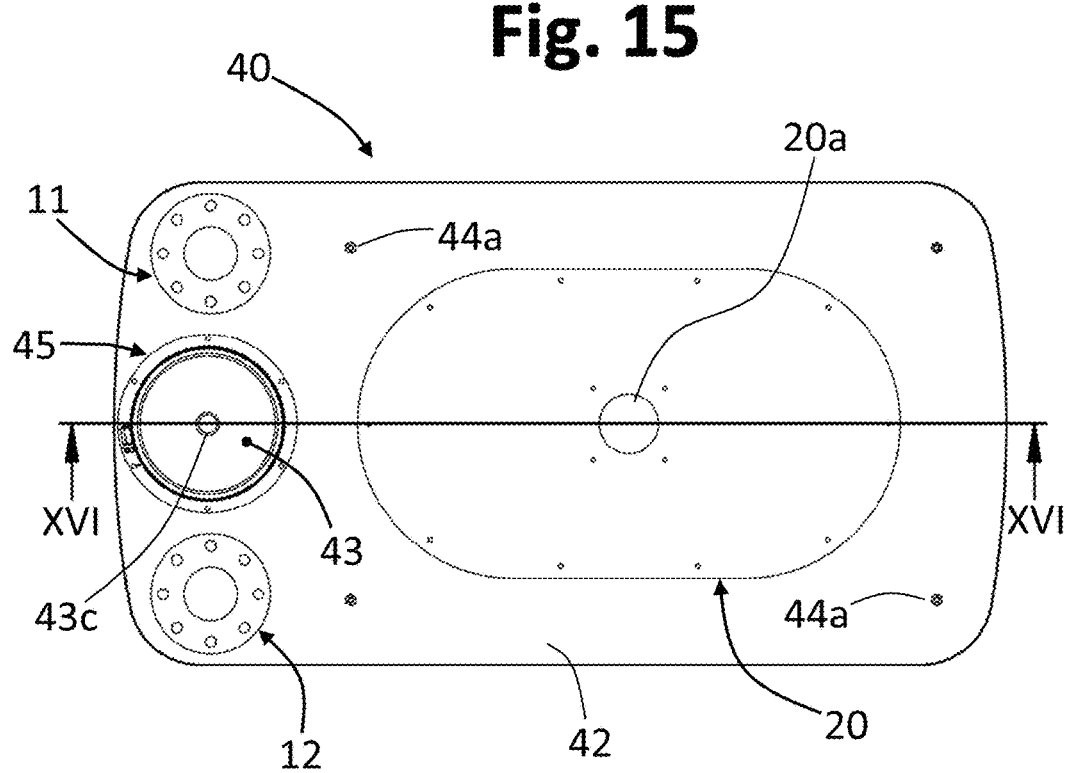
FIG. 15 is a top plan view of the heat exchanger of FIG. 13.
Figure 16:
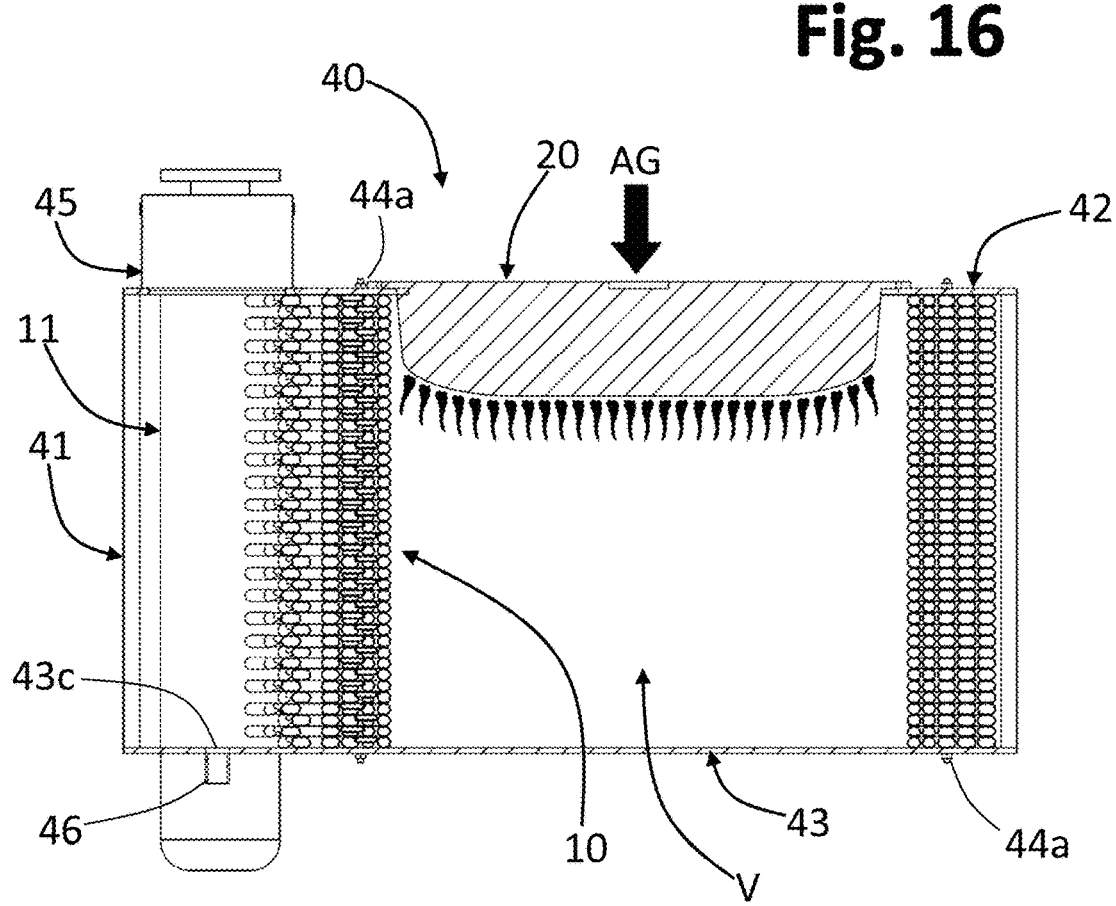
FIG. 16 is a schematic cross-sectional view according to the line XVI-XVI of FIG. 15.

In FIGS. 15 and 16, the heat exchanger 40 is represented in plan view and in cross-sectional view, respectively. From FIG. 16 there may in particular be appreciated the structure of the tube assembly 10, which is extremely compact in height, this enabling correspondingly compact dimensions of the heat exchanger 40 as a whole to be obtained.

Figure 17:
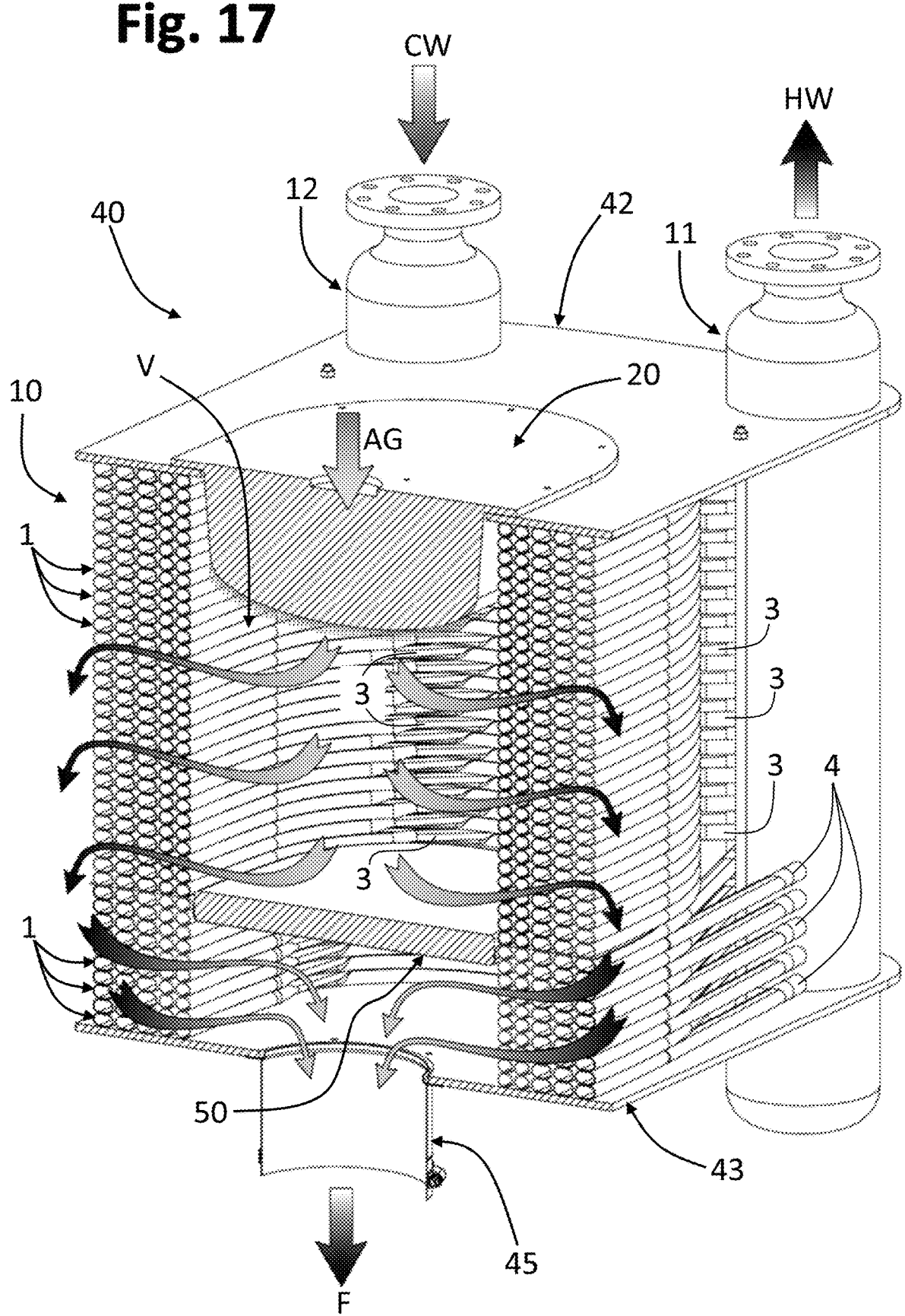
FIG. 17 is a sectioned perspective view of a heat exchanger according to further possible embodiments of the present invention.

Represented schematically in FIG. 17 is a heat exchanger 40 obtained according to possible variant embodiments of the invention. In this figure, for reasons of greater clarity, some elements of the heat exchanger have not been represented, such as the peripheral shell and the tie-rods. As may be noted, in this case, the exhaust connector or outlet 45 for the fumes that flow away from the assembly 10 (indicated by the arrow F) is in the lower part of the heat exchanger, in particular at the lower end plate 43. The outlet 45 is preferably set facing the hollow volume V defined by the inner turns of the superimposed tubes 1.

From FIG. 17 it is possible to appreciate the connection of the end portions 4 of some tubes 1 to the manifold 11, which is assumed as being the delivery manifold for the hot water or other heat-carrier fluid (arrow HW) to a heating system, as well as the connection of the end portions 3 of some other tubes 1 to the manifold 11 itself. The manifold 12 may be assumed as being a return manifold for the cold water or other heat-carrier fluid (arrow CW) from the aforesaid system.

In various embodiments, such as the one represented, within the assembly 10, between the burner 20 and the exhaust outlet 45, a barrier 50 for the fumes produced by the burner itself is provided. In the example represented, the burner 20 is located at the upper end plate 42, and the connector for outlet of the fumes 45 is located at the lower end plate 43, but not excluded is an arrangement opposite to the one exemplified.

The barrier 50 substantially divides the tube assembly 10 into two parts or sections, an upper one and a lower one, in order to force the fumes themselves to follow a predefined path. In particular, the presence of the barrier 50 forces the fumes produced by the burner 20 first to exit from the assembly 10, from the centre towards the outside, in the section upstream of the barrier 50, and then to return within the assembly 10, from the outside towards the inside, in the section downstream of the barrier. The flow of the fumes through the various stacked tubes takes place through the gaps or passageways defined between the tubes themselves, as explained previously, for example, in relation to FIG. 8 (where such a gap was designated by G).

Figure 18:
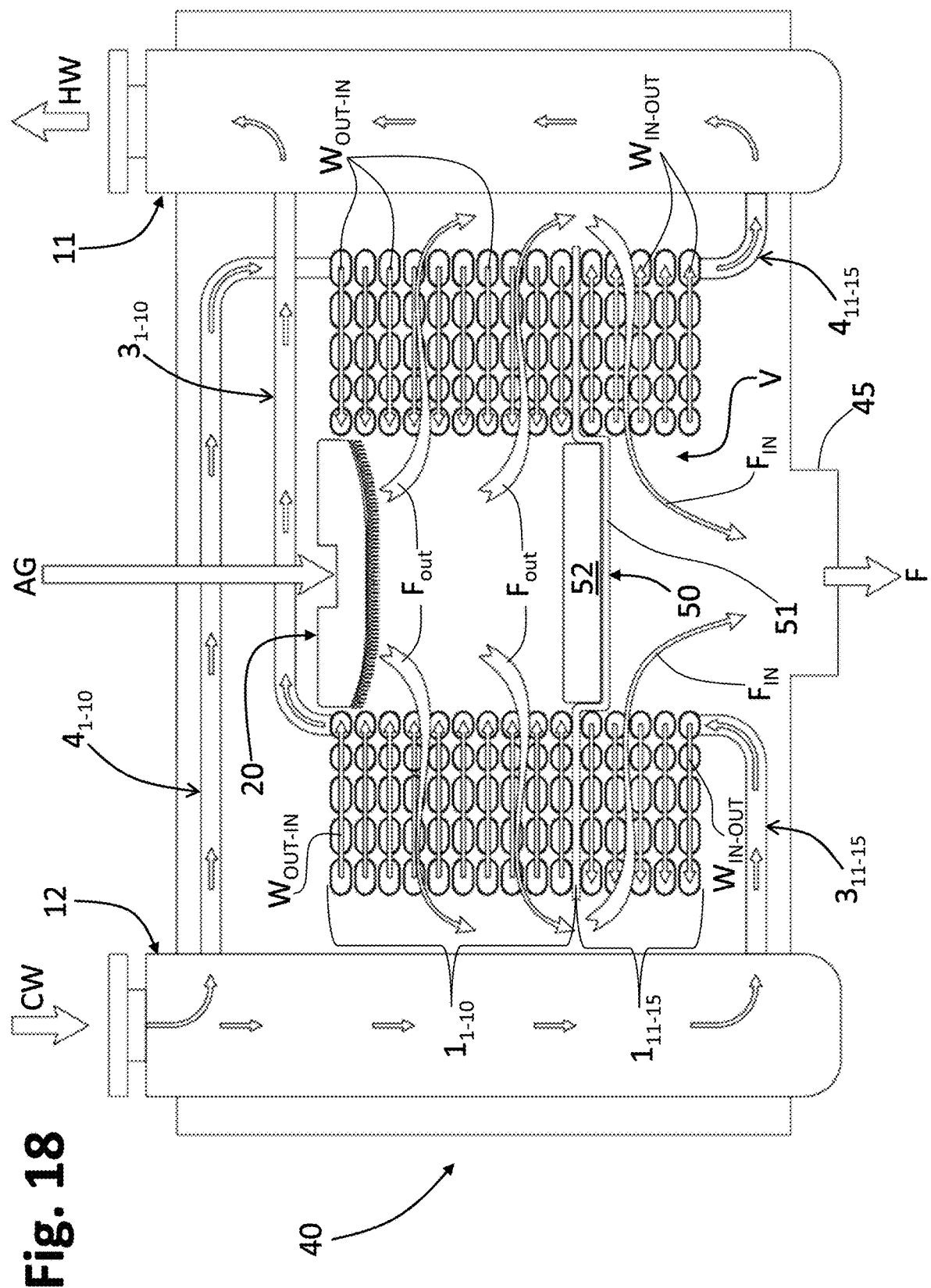
FIG. 18 is a schematic cross-sectional view aimed at exemplifying the hydraulic circuit of a heat exchanger according to FIG. 17.

Represented in FIG. 18 is a simplified hydraulic diagram of a heat exchanger 40 according to FIG. 18. The tube assembly of this heat exchanger comprises, merely by way of non-limiting example, fifteen tubes 1, but obviously the number could be different, either greater or smaller.

From FIG. 18 it may be noted how the barrier 50 divides the assembly into the two aforementioned sections, of which one—here the upper section—comprises the tubes designated as a whole by $1_{1-10}$, and the other—here the lower section—comprises the tubes designated as a whole by $1_{11-15}$. In various embodiments, the barrier comprises a transverse partition wall, designated by 51 (for example, in the form of diaphragm, which may comprise a metal plate), preferably shaped so as to have a peripheral portion that extends through the gap between the tubes 1 that are located at the interface between the two sections (i.e., with reference to the example represented, in the gap between the tenth and eleventh tubes 1 starting from above). The partition wall also has a central portion that obstructs the volume V inside the tube assembly, delimited by the inner turns of the various tubes 1. Hence, in various embodiments, also the volume V is accordingly divided into two parts, an upper part or a part upstream of the barrier 50, which forms a combustion chamber located in which is the burner 20, and a lower part or a part downstream of the barrier 50, which forms a condensation area.

In various embodiments, provided at the aforesaid central portion of the partition wall is a layer of thermally insulating material, for example made of silica fibre, designated by 52.

In the case exemplified, the end portions 3 of the tubes $1_{1-10}$ are connected to the delivery manifold 11, whereas the corresponding end portions 4 of the same tubes are connected to the return manifold 12. It should be noted that in FIG. 18, for requirements of clarity, not all the individual connections between the tubes $1_{1-10}$ and the manifolds 11 and 12 have been represented. In this perspective, the duct designated by $3_{1-10}$ is to be understood as representing all the portions 3 of the tubes $1_{1-10}$ connected in parallel to the delivery manifold 11, whereas the duct designated by $4_{1-10}$ is to be understood as representing all the portions 4 of the tubes $1_{1-10}$ connected in parallel to the return manifold 12.

Conversely, the end portions 3 of the tubes $1_{11-15}$ are connected to the return manifold 12, whereas the corresponding end portions 4 of the same tubes are connected to the delivery manifold 11. For the same requirements of clarity just referred to above, in FIG. 18 not all the individual connections between the tubes $1_{11-15}$ and the manifolds 11 and 12 have been represented. In this perspective, the duct designated by $3_{11-15}$ is to be understood as representing all the portions 3 of the tubes $1_{11-15}$ connected in parallel to the return manifold 12, whereas the duct designated by $4_{11-15}$ is to be understood as representing all the portions 4 of the tubes $1_{11-15}$ connected in parallel to the delivery manifold 11.

In operation, the air-gas mixture AG is supplied to the burner 20, which is substantially at the centre of the hollow volume V defined by the tube assembly. The flame produced by the burner 20 produces the fumes, which seek to reach the outlet 45, passing through the gaps between the stacked tubes $1_{1-10}$, from the inside to the outside of the assembly, as exemplified by the arrows denoted by $F_{OUT}$. These fumes $F_{OUT}$ are not able to flow directly in the axial direction towards the outlet 45, given the presence of the barrier 50 and hence find an outlet into the space that surrounds the tube assembly, the fumes themselves being in any case confined by the casing of the heat exchanger 40 (basically, the fumes reach the space defined between the outer turns of the superimposed tubes and the shell of the heat exchanger).

Given that the tubes $1_{1-10}$ are supplied starting from their end portions $4_{1-10}$, the corresponding flow of water will be carried from the outer turns towards the inner turns, as represented schematically by the arrows $W_{OUT-IN}$ in FIG. 18, i.e., with a path in countercurrent with respect to that of the fumes $F_{OUT}$. In their path, the fumes $F_{OUT}$ hence lap the outside of the tubes $1_{1-10}$, thus transferring their heat. In particular, the majority of the heat of the fumes $F_{OUT}$ will be transferred to the inner turns of the tubes, heating the respective water, which can hence pass via the corresponding end portions $3_{1-10}$ to the delivery manifold 11, and then be transferred progressively to the other turns of the individual tubes towards the outside of the corresponding spiral. The inner turns will to a certain extent be heated also by irradiation with the flame produced by the burner 20. The temperature of the fumes $F_{OUT}$ through the gaps between the tubes $1_{1-10}$ will decrease as the fumes themselves proceed towards the corresponding outer turns that contain the cooler return water received by the manifold 12 via the end portions $4_{1-10}$, thus transferring latent heat of condensation to these turns.

The fumes that have passed on the outside of the assembly, in their path towards the outlet 45, then tend to fall back into the central hollow volume V of the tube assembly, downstream of the barrier 50, i.e., in the gaps between the tubes $1_{11-15}$. This path of the fumes is represented schematically by the arrows $F_{IN}$ in FIG. 18.

Given that the tubes $1_{11-15}$ are supplied starting from their portions $3_{11-15}$, the corresponding flow of water will be carried from the inner turns towards the outer turns, as represented schematically by the arrows $W_{IN-OUT-IN}$ in FIG. 18, i.e., once again, with a path in countercurrent with respect to that of the fumes $F_{IN}$. Also the fumes $F_{IN}$ hence lap the outside of the tubes $1_{11-15}$, thus transferring their residual heat, including latent heat of condensation. In particular, the majority of the heat of the fumes $F_{IN}$ will be transferred to the outer turns of the tubes, heating the respective water, which can hence pass to the delivery manifold 11 via the corresponding end portions $4_{11-15}$, and then be transferred to the other turns of the individual tubes towards the inside of the corresponding spiral. The temperature of the fumes $F_{IN}$ through the gaps between the tubes $1_{11-15}$ will decrease further, as the fumes themselves proceed towards the corresponding inner turns that contain the cooler return water received by the manifold 12 via the end portions $3_{11-15}$, transferring the remaining part of the latent heat of condensation to these turns.

Figure 19:
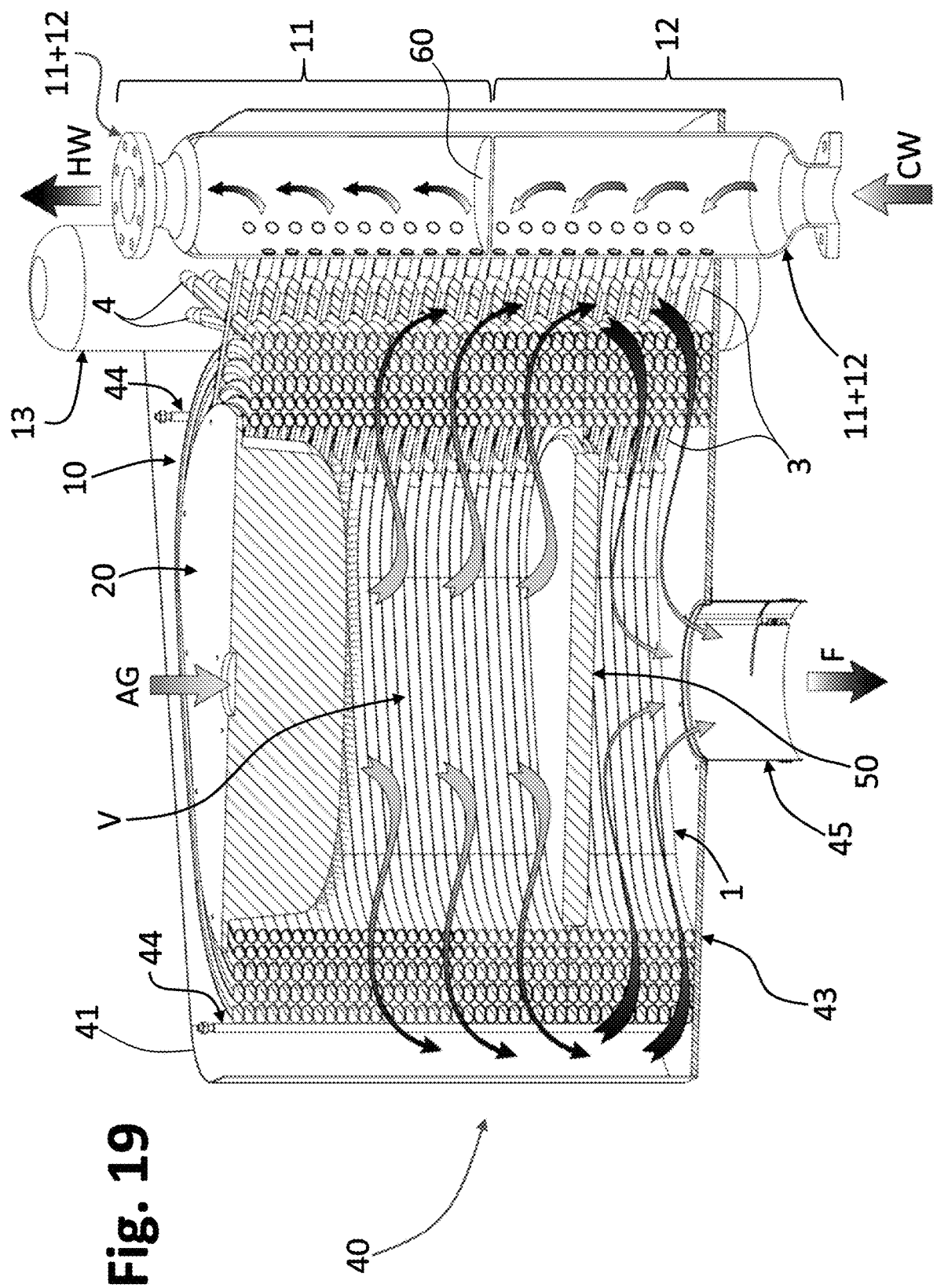
FIG. 19 is a sectioned perspective view of a heat exchanger according to further possible embodiments of the present invention.

Represented schematically in FIG. 19 is a heat exchanger 40 obtained according to further possible variant embodiments of the invention. In this figure, for requirements of greater clarity, some elements of the heat exchanger, such as the upper end plate, are not represented. As may be noted, also in this case, the exhaust connector or outlet 45 for the fumes that flow away from the assembly 10, indicated by the arrow F, is in the lower part of the heat exchanger, associated to the end plate 43.

Also the heat exchanger 40 of FIG. 19 is provided, between the burner 20 and the exhaust outlet 45, with a barrier 50 for the fumes produced by the burner (as described with reference to FIGS. 17-18), which here divides the tube assembly substantially into two equal parts or sections even though this does not constitute an essential characteristic. The flow of the fumes produced by the burner 20, in relation to the presence of the barrier 50, is substantially similar to what has been described above with reference to FIGS. 17-18.

Provided in the heat exchanger 40 of FIG. 19 is a further manifold member 13, here referred to as "by-pass manifold", which substantially defines a volume designed for containment and passage of a heat-carrier fluid that must be heated via the heat exchanger 40, for example water of a heating system. In any case, provided in the heat exchanger 40 are the two manifolds, the delivery manifold 11 and the return manifold 12, which are here integrated in one and the same manifold member designated as a whole by 11+12. In the example, the manifold member 11+12 comprises a tubular body having an intermediate partition or wall 60 that divides the volume inside the member itself in two separate hydraulic sections, corresponding to the manifolds designated by 11 and 12, provided with an outlet and an inlet, respectively, defined at the corresponding ends of the member 11+12. The manifolds 11 and 12 could in any case be configured as distinct parts.

Also in this case, the arrows CW and HW indicate, respectively, the flow of cold water (or other fluid) returning from the system to the manifold 12 and the flow of hot water (or other fluid) sent to the system. Also visible in FIG. 19 are the connections between the end portions 3 of some tubes 1 to the manifolds 11 and 12, as well as the connections between the end portions 4 of some tubes 1 to the by-pass manifold 13.

Figure 20:
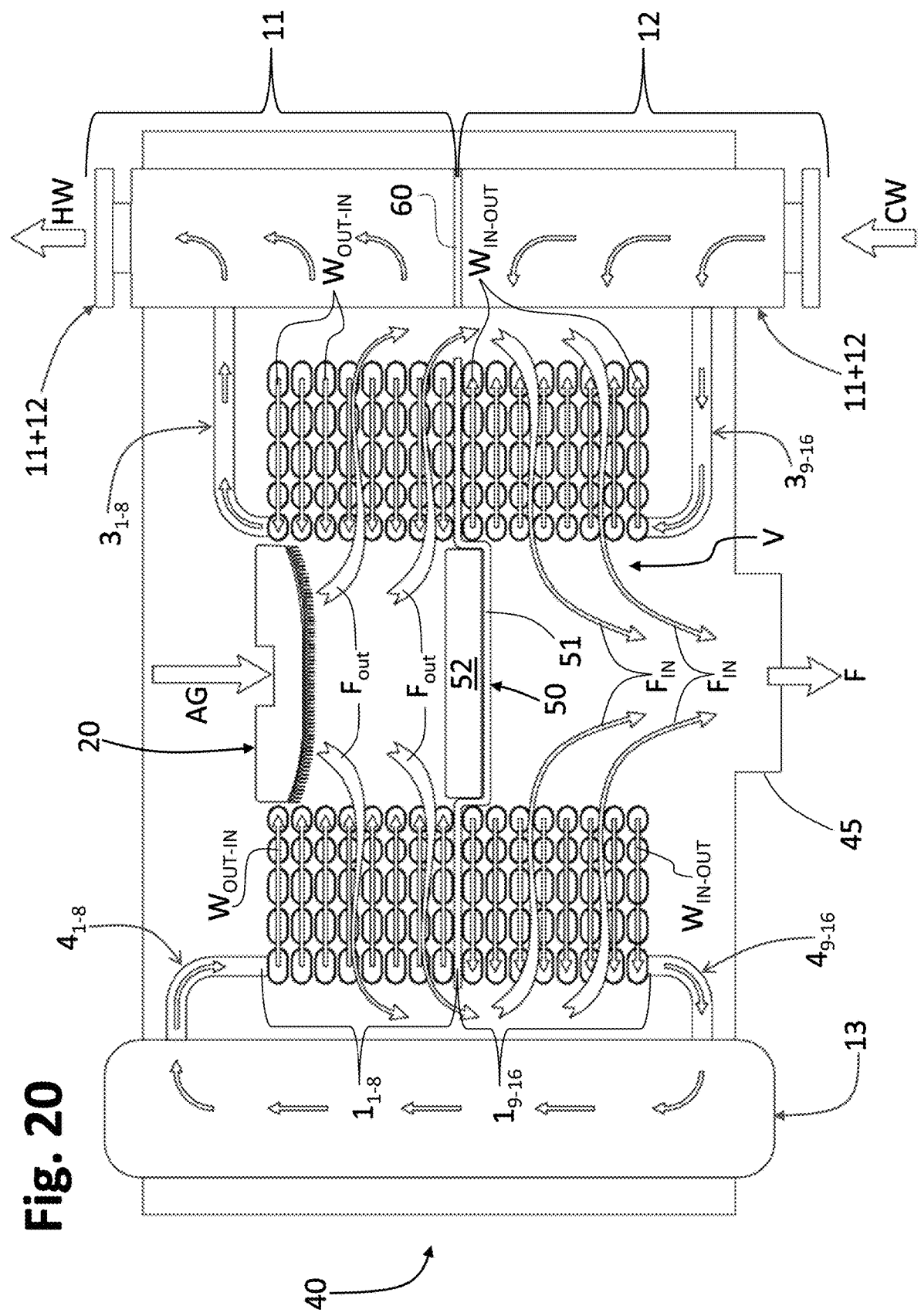
FIG. 20 is a schematic cross-sectional view aimed at exemplifying the hydraulic circuit of a heat exchanger according to FIG. 19.

Represented in FIG. 20 is a simplified hydraulic diagram of a heat exchanger 40 according to FIG. 19. The tube assembly of this heat exchanger comprises, merely by way of non-limiting example, sixteen tubes 1, but obviously the number could be different, either greater or smaller.

From FIG. 20 it may be noted how the barrier 50 divides the assembly into two sections, one of which—here the upper section—comprises the tubes designated as a whole by $1_{1-8}$, and the other—here the lower section—comprises the tubes designated as a whole by $1_{9-16}$. The barrier 50 may be similar as regards conception and functionality to the ones described previously, and hence comprise a transverse partition wall 51, with a peripheral part that extends through the gap between the tubes 1 that are located at the interface between the two sections (i.e., with reference to the example represented, in the gap between the eighth and ninth tubes 1 starting from the top), as well as a central portion that obstructs the internal volume V of the tube assembly, possibly provided with a layer of thermally insulating material 52.

In the case exemplified, the end portions 3 of the tubes $1_{1-8}$ are connected to the delivery manifold 11, whereas the corresponding end portions 4 of the same tubes are connected to the by-pass manifold 13, in particular substantially in its upper half. It should be noted that, also in FIG. 20, for requirements of clarity, not all the individual connections between the tubes $1_{1-8}$ and the manifolds 11 and 13 have been represented. In this perspective, the duct designated by $3_{1-8}$ is to be understood as representing all the portions 3 of the tubes $1_{1-10}$ connected in parallel to the delivery manifold 11, whereas the duct designated by $4_{1-8}$ is to be understood as representing all the portions 4 of the tubes $1_{1-8}$ connected in parallel to the by-pass manifold 13.

Conversely, the end portions 3 of the tubes $1_{9-16}$ are connected to the return manifold 12, whereas the corresponding end portions 4 of the same tubes are connected to the by-pass manifold 13, in particular substantially in its lower half. For the same requirements of clarity just referred to above, in FIG. 20 not all the individual connections between the tubes $1_{9-16}$ and the manifolds 11 and 13 have been represented. In this perspective, the duct designated by $3_{9-16}$ is to be understood as representing all the portions 3 of the tubes $1_{9-16}$ connected in parallel to the return manifold 12, whereas the duct designated by $4_{9-16}$ is to be understood as representing all the portions 4 of the tubes $1_{9-16}$ connected in parallel to the by-pass manifold 13.

Also in this case, the air-gas mixture AG is supplied to the burner 20, which is substantially at the centre of the hollow volume V defined by the tube assembly. The flame produced by the burner 20 produces the fumes, which seek to reach the outlet 45, passing through the gaps between the superimposed tubes $1_{1-8}$, from the inside to the outside of the assembly, as exemplified by the arrows denoted by $F_{OUT}$. These fumes $F_{OUT}$ are not able to flow axially towards the outlet 45, given the presence of the barrier 50, and hence find outlet into the space that surrounds the tube assembly, as explained previously.

In general, the path of the water through the tube assembly starts from the manifold 12. The cooler return water from the system enters the tubes $1_{9-16}$ via the respective end portions $3_{9-16}$ and then passes into the by-pass manifold 13 via the respective end portions $4_{9-16}$. From the by-pass manifold 13 the water then passes into the tubes $1_{1-8}$, through the respective end portions $4_{1-8}$, and then reaches the delivery manifold 11 through the respective end portions $3_{1-8}$.

Given that the tubes $1_{1-8}$ are supplied starting from their end portions $4_{1-8}$, the corresponding flow of water will be carried from the outer turns towards the inner turns, as represented schematically by the arrows $W_{OUT-IN}$ in FIG.

20, with a path in countercurrent with respect to that of the fumes $F_{OUT}$. Also in this case, the fumes $F_{OUT}$ lap the outside of the tubes $1_{1-10}$ transferring their heat, the majority of the heat being transferred to the inner turns of the tubes, heating the respective water, which can hence pass, via the corresponding end portions $3_{1-8}$, to the delivery manifold 11, and then be transferred progressively to the other turns of the individual tubes towards the outside of the corresponding spiral. The temperature of the fumes $F_{OUT}$ through the gaps between the tubes $1_{1-8}$ will decrease as the fumes themselves proceed towards the corresponding outer turns that contain cooler water received from the by-pass manifold 13 via the end portions $4_{1-8}$, transferring to these turns latent heat of condensation.

Also in this case, the fumes that have passed on the outside of the assembly, in their path towards the outlet 45, then tend to fall back into the central hollow volume V of the tube assembly, downstream of the barrier 50, i.e., in the gaps between the tubes $1_{9-16}$. This path of the fumes is represented schematically by the arrows $F_{IN}$ in FIG. 20.

Given that the tubes $1_{9-16}$ are supplied starting from their portions $3_{9-16}$ by the manifold 12, the corresponding flow of water will be carried from the inner turns towards the outer turns, as represented schematically by the arrows $W_{IN-OUT}$ in FIG. 20, i.e., once again, with a path in countercurrent with respect to that of the fumes $F_{IN}$. Also the fumes $F_{IN}$ hence lap the outside of the tubes $1_{9-16}$ transferring their residual heat, including latent heat of condensation. In particular, the majority of the heat of the fumes $F_{IN}$ will be transferred to the outer turns of the tubes, heating the respective water, which can hence pass to the by-pass manifold 13 via the corresponding end portions $4_{9-16}$, and then be transferred to the other turns of the individual tubes towards the inside of the corresponding spiral. The temperature of the fumes $F_{IN}$ through the gaps between the tubes $1_{9-16}$ will decrease further, as the fumes themselves proceed towards the corresponding inner turns that contain the cooler return water received from the manifold 12 via the end portions $3_{9-16}$, transferring to the aforesaid turns the remaining part of the latent heat of condensation.

It will hence be appreciated that the water supplied to the lower part of the by-pass manifold 13, via the end portions $4_{9-16}$ of the tubes $1_{9-16}$, will be basically water that is already at least in part heated, which may lose part of its own heat as it rises within the manifold 13 itself. In any case, the water supplied by the upper part of the by-pass manifold 13 to the ends $4_{1-8}$ of the tubes $1_{1-8}$ will be basically heated or lukewarm water, in any case having in general a temperature higher than that of the water at inlet to the heat exchanger through the return manifold 12.

From the foregoing description, the characteristics of the present invention emerge clearly, as likewise its advantages. The invention affords important advantages in terms of encumbrance, enabling tube assemblies, and hence heat exchangers for heating devices, to be obtained, which are extremely compact in the direction of juxtaposition of the tubes. A substantial advantage of the invention is in fact represented by the modularity of the tubes proposed, which can be easily assembled in compact batteries thanks to the fact that the tubes themselves have a substantially constant height, and can hence be easily set up against one another. The solution proposed does not impose the need to provide a connection manifold within the spiral of the various juxtaposed tubes, or to shape the first end portion of each tube so that it extends in an axial direction of the tube assembly for the purposes of connection to a manifold set outside. It will then be appreciated that, by varying the number of juxtaposed tubes and the structure of the manifolds, it is possible to create in a simple way tube assemblies, and hence heat exchangers, that have different powers. It is evidently possible to manage different powers also as a function of the number of turns of the juxtaposed tubes. The heat exchanger according to the invention finds advantageous application both in the sector of high-power water heaters for producing domestic hot water and in the sector of high-power boilers, as well as for obtaining other types of heating devices.

It is clear that numerous variations may be made by the person skilled in the branch to the heat exchanger and the heat-exchanger tube described by way of example, without thereby departing from the scope of the present invention, as defined by the annexed claims.

Previously, reference was made to tubes that comprise a plurality of turns 2a-2c and that have the portions 3 and 4 substantially parallel, with the respective ends 3a, 4a facing in one and the same direction. This does not constitute, however, an essential characteristic of the invention. For instance, in various other embodiments the number of turns of each tube may be greater or smaller than the one exemplified in the figures discussed previously (for example, for the purposes of production of heat exchangers with different heating powers) and/or one or both of the end portions 3 and 4 may have different orientations, for example as a function the geometry of the heat exchanger (such as the position of the manifold members).

Figure 21:
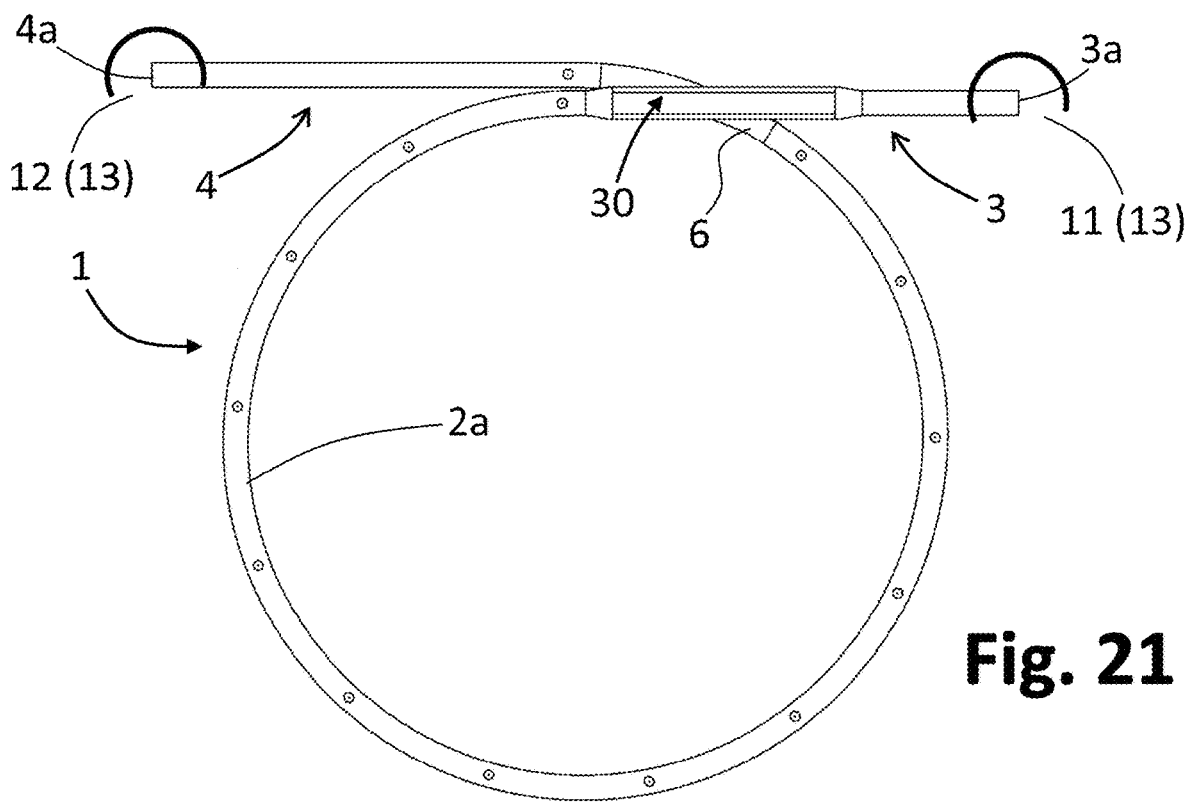
Figure 22:
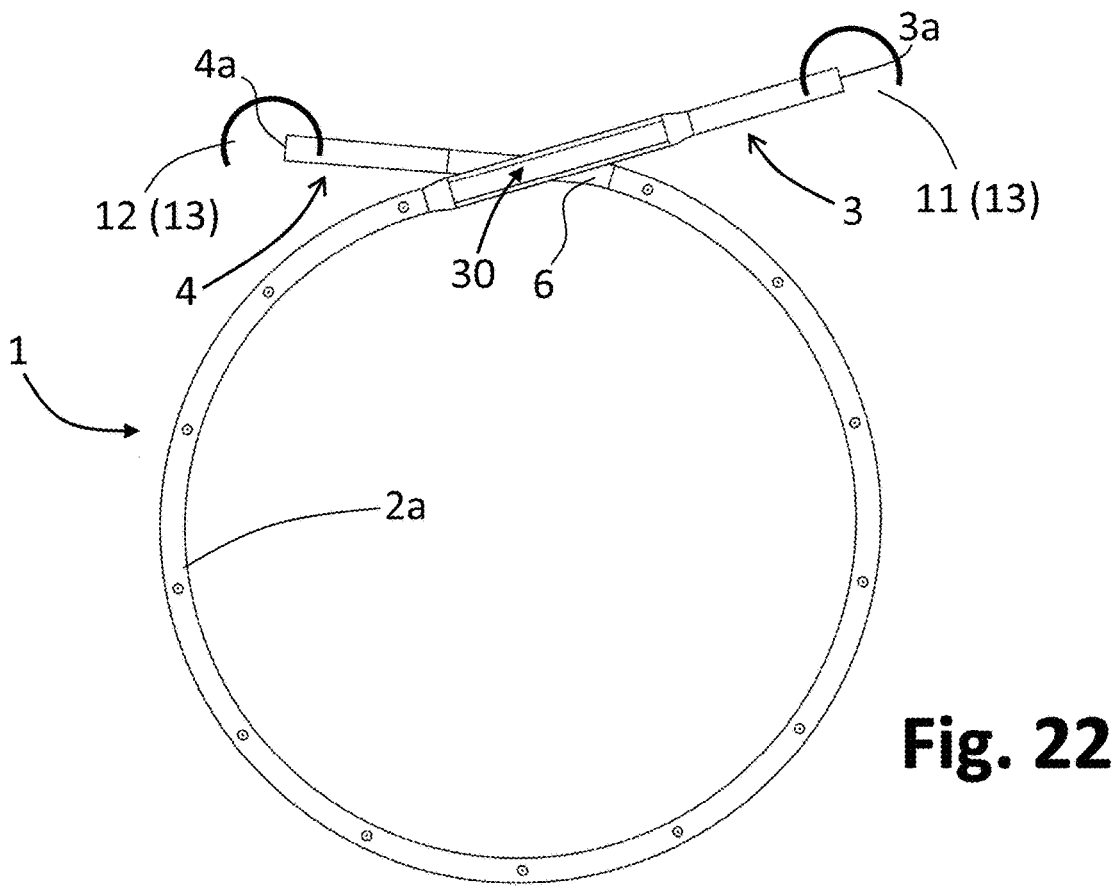

For instance, FIG. 21 illustrates the case of a tube 1 wound so as to define a single complete spiral 2a, with the two end portions 3 and 4 that are substantially parallel but with the respective ends 3a, 4a facing in opposite directions. FIG. 22 illustrates the similar case of a tube 1 defining a spiral with a terminal stretch shaped for providing the end portion 4, where the transverse depression 6 that receives the first end portion 3 is defined; hence, the two portions 3 and 4 substantially cross one another (as in the cases of FIGS. 9 and 11). Tubes with a single turn, for example of the type illustrated in FIGS. 21 and 22, may be used for producing traditional heat exchangers (i.e., not condensation heat exchangers), which use only a part of the sensible heat of the combustion fumes, preventing condensation thereof.

FIG. 23 regards a tube that includes just one inner turn 2a and one outer turn 2b, with the end portions 3 and 4 oriented as in FIG. 21, i.e., substantially parallel and with ends 3a, 4a facing in opposite directions. FIG. 24 likewise illustrates the case of a tube with two turns with end portions 3 and 4 substantially parallel but with ends 3a, 4a facing in one and the same direction. Finally, FIG. 25 illustrates the case of a tube 1 wound so as to define two spirals 2a and 2b, with the two end portions 3 and 4 that are set substantially orthogonal to one another.

The concepts represented in FIGS. 21-25 may be applied to the structures of heat exchanger 40 described previously.

Figure 25:
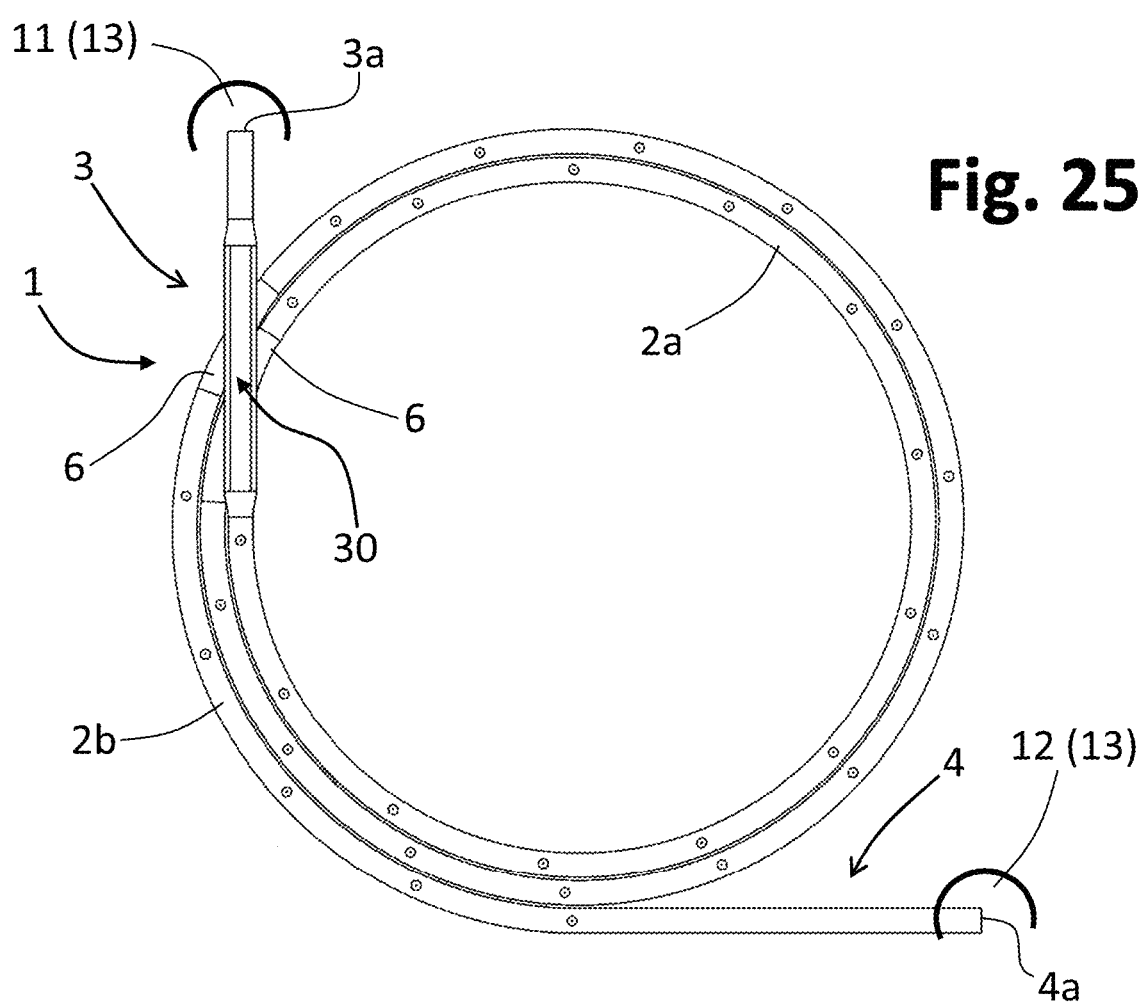

It will be appreciated that in various embodiments—such as those of FIGS. 1-2, of FIG. 24, and of FIG. 25—the spiral defined by the tube comprises a certain number of complete turns plus at least one fraction of a further turn.

As may be understood, the number of turns of each spiral and the orientation of the end portions 3 and 4 may be variable, also different from the ones exemplified in the figures. It is likewise evident that the concepts exemplified with reference to FIGS. 21-25 may be applied also in the case of generally oblong plane spirals like those of FIGS. 9 and 11.

The cross section of the tubes 1 does not necessarily have to be circular or elliptical, it being possible for them to have other shapes. The tubes 1 may be formed also in a number of parts joined, in particular welded, together. For instance, the end portions 3 and/or 4 could be obtained separately, with a material and/or a thickness and/or a shape in cross section different from that/those of the remaining part of the tube 1, and then joined to the latter via welding.

According to possible variant embodiments, a tube according to the invention has at least one further transverse depression defined in at least one corresponding turn, which is additional to the at least one transverse depression or depressions 6 described previously, and that is configured for receiving at least partially a corresponding part of an end portion of an adjacent tube.

Embodiments of this type are exemplified in FIGS. 26-30, where the same reference numbers as those of FIGS. 1-25 are used to designate elements that are technically equivalent to the ones already described above. The concepts described with reference to FIGS. 1-25 may be applied also to the case of the tubes of FIGS. 26-30.

Figure 26:
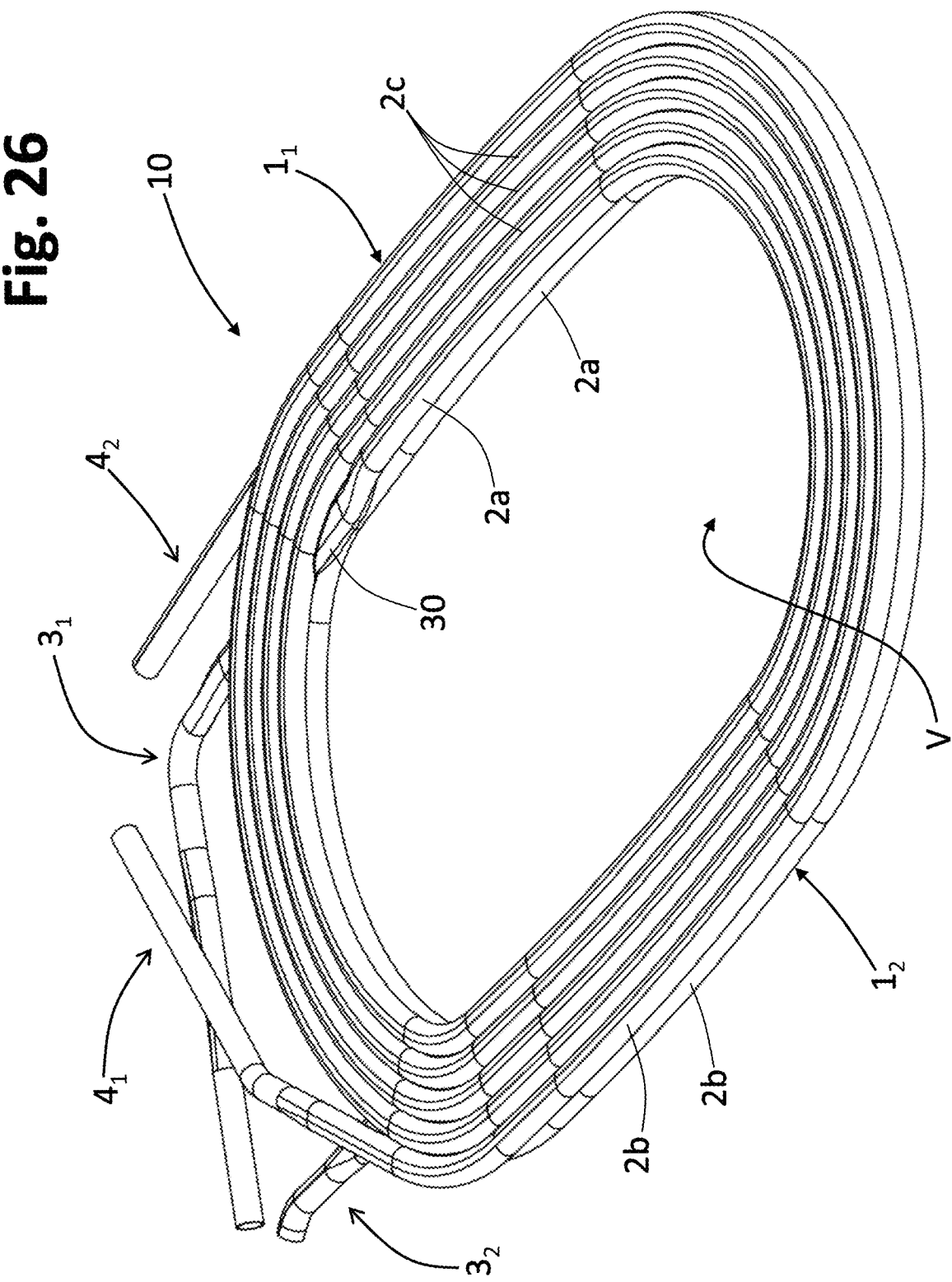
FIG. 26 is a schematic perspective view of a tube assembly comprising two tubes according to possible variant embodiments of the invention.

With initial reference to FIG. 26, in various embodiments, in order to obtain a tube bundle one or more elements are used, each formed by one or more pairs of superimposed tubes. In FIG. 26, such an element is designated by 10, whereas the two tubes of the element 10 are designated by 10$_1$ and 10$_2$ (respectively the one higher up and the one lower down in the figure) only for requirements of easier description and understanding of the drawings. For the same reason, also the end portions of the tubes 10$_1$ and 10$_2$ are designated by 3$_1$, 4$_1$ and 3$_2$, 4$_2$, respectively.

Figure 27:
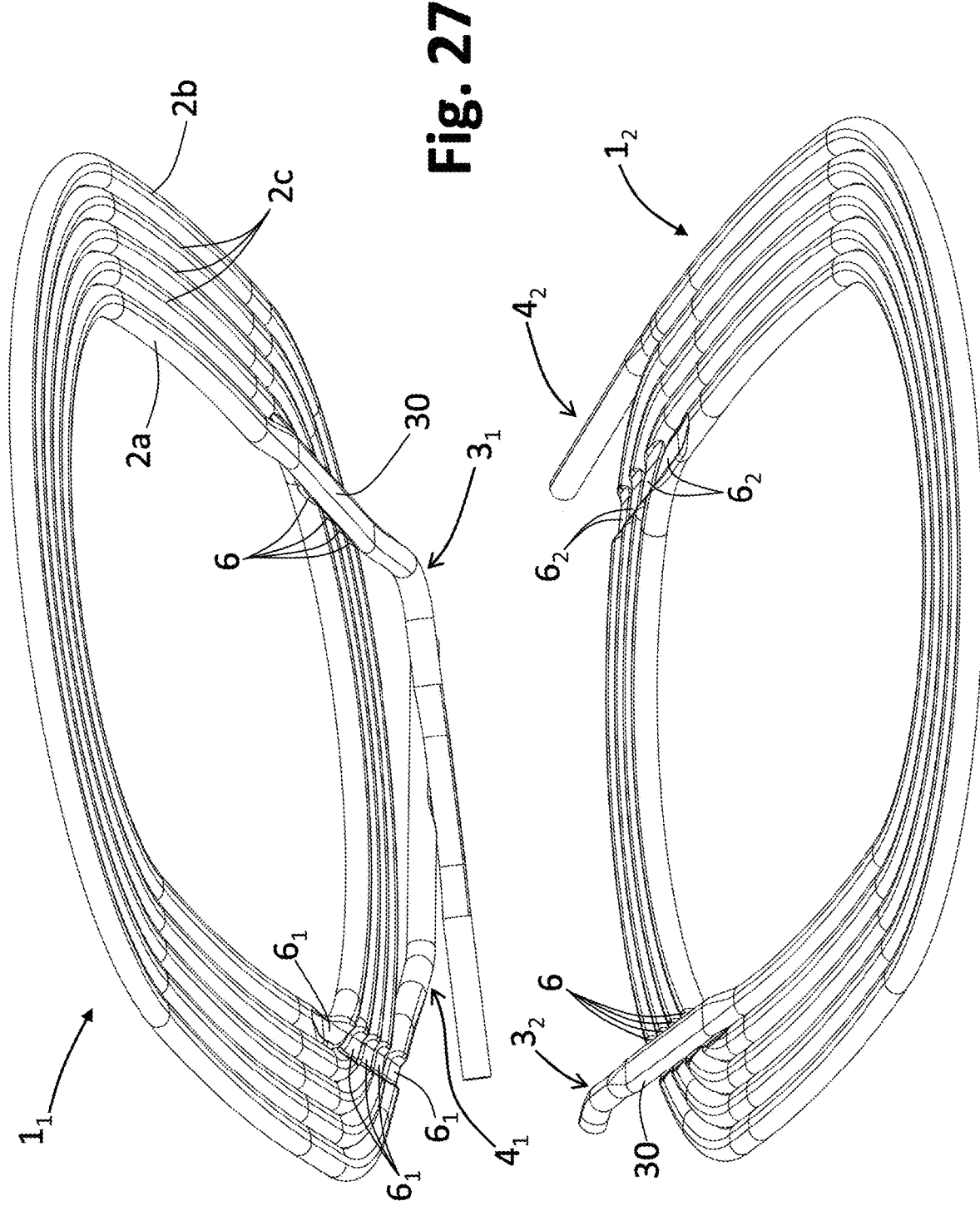
FIG. 27 is an exploded view of the tube assembly of FIG. 26.

As may be noted in particular in FIG. 27, in addition to the depressions 6 described previously, the tube 1$_1$ has, in its face set facing the tube 1$_2$ (here the lower face), a series of further transverse depressions aligned to one another, designated by 6$_1$, which are configured for housing at least partially one of the end portions of the tube 1$_2$, in particular a part 30 of its portion 3$_2$. Preferentially, also the tube 1$_2$ has, in its face set facing the tube 1$_1$ (here the upper face), a series of further transverse depressions aligned with one another, designated by 6$_2$, which are configured for housing at least partially one of the end portions of the tube 1$_1$, in particular a part 30 of its portion 3$_1$.

Hence, more in general, a first tube (1$_1$ or 1$_2$) has at least one further transverse depression (6$_1$ or 6$_2$) defined in the at least one turn thereof (2a, 2b, 2c), where in this at least one further transverse depression (6$_1$ or 6$_2$) there is at least partially received a corresponding part (30) of a first end portion (3$_1$ or 3$_2$) of a second tube (1$_2$ or 1$_1$) that is juxtaposed to the at least one first tube (1$_1$ or 1$_2$).

In the example represented, the two tubes 1$_1$ and 1$_2$ are practically the same as one another in the part wound in a spiral, differing from one another only as regards the development of the respective terminal portions 3$_1$, 4$_1$ and 3$_2$, 4$_2$.

As may be appreciated from FIGS. 26 and 27, in various particularly advantageous embodiments, following upon stacking of the two tubes 1$_1$ and 1$_2$ of the pair 10 on one another, one and the same end portion of one of the two tubes (in particular, the end portion 3$_1$ or 3$_2$ that extends from the corresponding inner turn 2a), will be partially received both in the depressions 6 of the corresponding tube and in the depressions 6$_1$ or 6$_2$ (according to the case) of the other tube. For this purpose, of course, following upon stacking of the two tubes 1$_1$ and 1$_2$, the depressions 6 of a tube will be set facing and opposed to the depressions 6$_1$ or 6$_2$ (according to the case) of the other tube.

More in general, then, at least one first end portion (3$_1$ or 3$_2$) of one of the first tube (1$_1$) and the second tube (1$_2$) is housed in part in the at least one transverse depression (6) of the tube itself and in part in the at least one further transverse depression (6$_1$ or 6$_2$) of the other one of the first tube (1$_1$) and the second tube (1$_2$).

Figure 28:
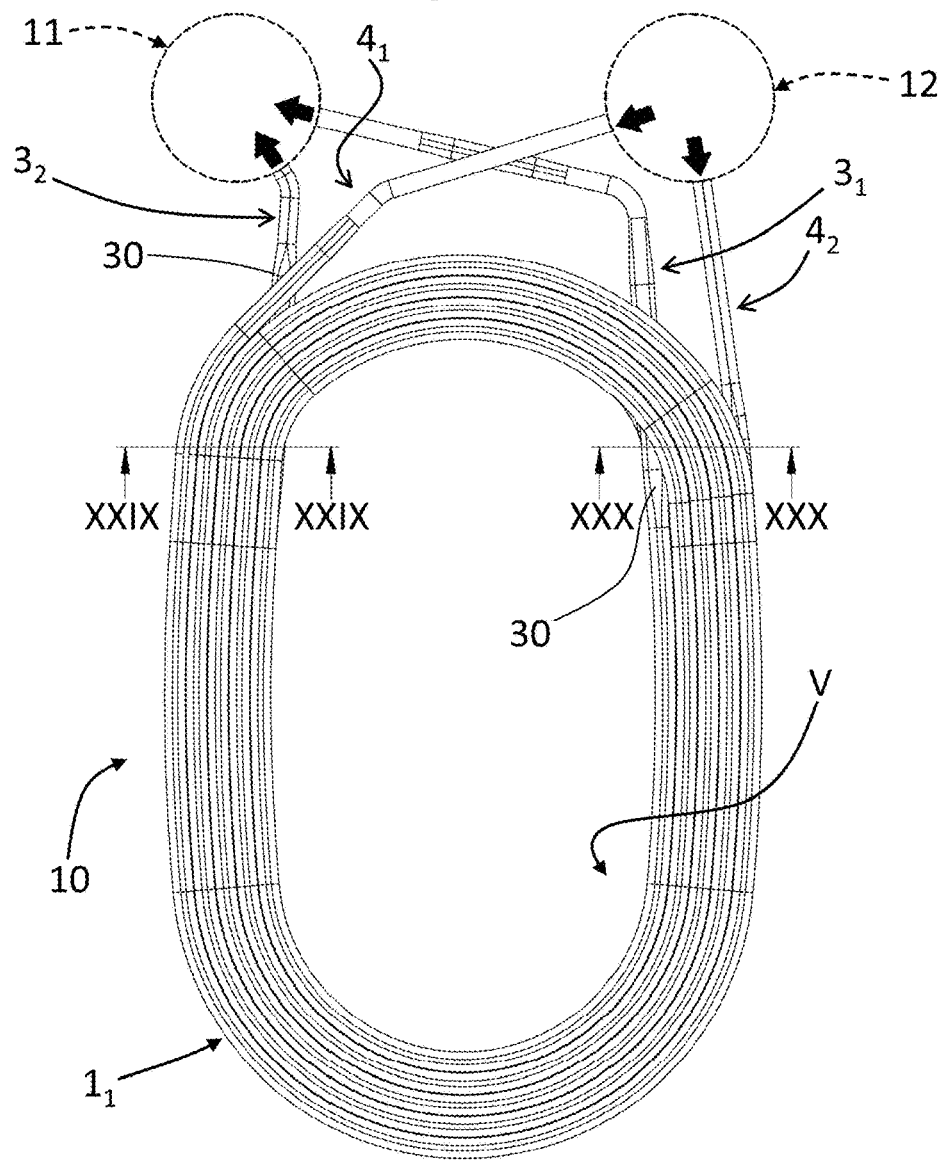
FIG. 28 is a schematic top plan view of the tube assembly of FIG. 26.
Figure 29:
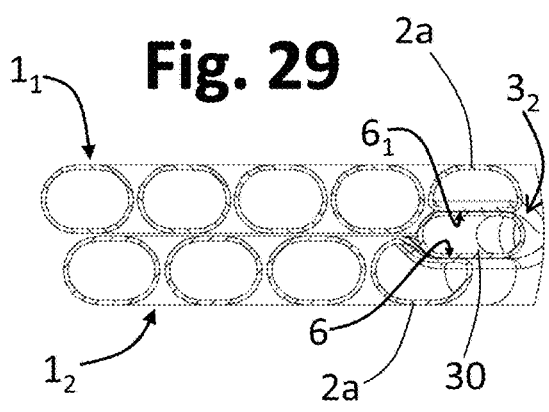
FIGS. 29 and 30 are schematic cross-sectional view according to the lines XXIX-XXIX and XXX-XXX, respectively, of FIG. 28.
Figure 30:
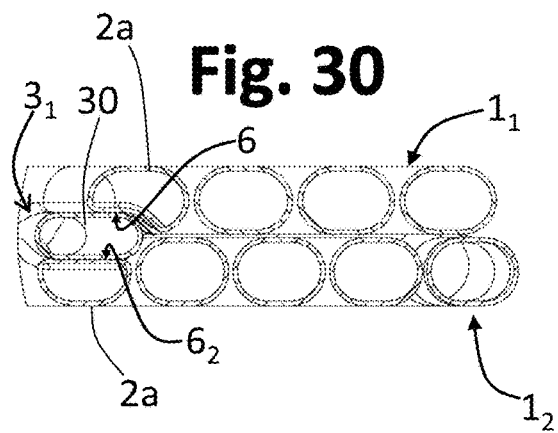

As has been said, the element 10 of FIG. 26 is obtained by superimposing the two tubes 1$_1$ and 1$_2$, laterally projecting from which are the terminal return portions 4$_1$, 4$_2$ (on the outside) and the two terminal delivery portions 3$_1$, 3$_2$ (on the inside), for example for connection to corresponding manifold members 1$_1$ and 1$_2$ of the heat exchanger, as represented schematically in FIG. 28. For the purposes of formation of the tube bundle of the heat exchanger, a number of elements 10 may be juxtaposed with respect to one another, according to the desired heating power for the heating device that comprises the heat exchanger.

In embodiments of the type exemplified in FIGS. 26 and 27, the depressions 6-6$_1$ and/or 6-6$_2$ imply a flattening of the corresponding tubes 1$_1$ and 1$_2$ to approximately one third of their height. In this perspective, the part of the end portion 3$_1$ or 3$_2$ that is to be received between the facing depressions 6-6$_1$ or 6-6$_2$ will also preferably comprise a stretch of tube 30 having a profile substantially flattened or squashed to approximately one third of its height (i.e., of the prevalent profile of the tube), at least in a position corresponding to the aforesaid depressions. This characteristic may be clearly appreciated, for example, from the detailed cross-sectional views of FIGS. 29 and 30.

Also in the case of embodiments of the type illustrated and described with reference to FIGS. 26-30, the tubes 1$_1$ and 1$_2$ of each element or pair 10 are set at a distance from one another thanks to suitable spacer means, such as parts in relief of the type previously designated by 5 or 5' (not represented in FIGS. 26-30), preferably defined in an alternating way both on the upper face and on the lower face of each tube 1$_1$ and 1$_2$, in order to enable coupling of the various tubes to one another, as well as stacking of the various elements 10 on top of one another, maintaining the distance between the turns constant.

The invention claimed is:

1. A heat exchanger, comprising:
   a tube assembly, which includes a plurality of tubes arranged in a side by side configuration,
   at least one first manifold member, which is outside the tube assembly,
   wherein each tube of the plurality of tubes is wound to define a planar spiral having at least one turn,
   wherein at least one first tube, or each tube of the plurality of tubes, has a first end portion, which extends starting from the inside of the corresponding planar spiral towards the outside thereof, the first end portion being at least partially superimposed on the at least one turn, in a position corresponding to a major face of the planar spiral, for connection to the at least one first manifold member,
   wherein the at least one first tube, or each tube of the plurality of tubes, has at least one transverse depression defined in the at least one turn,
   and wherein the at least one transverse depression at least partially receives a corresponding part of the first end portion.

2. The heat exchanger according to claim 1, wherein:
   the planar spiral of the at least one first tube, or of each tube of the plurality of tubes, has a plurality of co-planar turns, which comprise at least one inner turn and at least one further turn around the inner turn, the first end portion extending starting from the inner turn,
   the at least one first tube, or each tube of the plurality of tubes, has a plurality of transverse depressions, each defined in a respective turn of the plurality of co-planar turns in a position corresponding to said major face of the planar spiral, the transverse depressions being in positions aligned to each other according to a direction of extension of the first end portion, to form a seat in which the first end portion is at least partially received.

3. The heat exchanger according to claim 2, wherein:
the at least one further turn of the at least one first tube, or of each tube of the plurality of tubes, comprises a plurality of further turns, which include an outer turn and one or more intermediate turns between the inner turn and the outer turn.

4. The heat exchanger according to claim 1, wherein the first end portion of the at least one first tube, or of each tube of the plurality of tubes, comprises a stretch of tube having a profile that is at least in part flattened or planed at least in a position corresponding to one said transverse depression defined in the at least one turn, or in each turn of a plurality of turns of the corresponding planar spiral.

5. The heat exchanger according to claim 1, wherein the at least one turn, or each turn of a plurality of turns of the corresponding planar spiral, comprises a stretch of tube having a profile at least in part flattened or planed at the corresponding transverse depression.

6. The heat exchanger according to claim 1, wherein the at least one first tube is side by side relative to a second tube of the plurality of tubes at a second major face of the corresponding planar spiral.

7. The heat exchanger according to claim 1, comprising spacer means to define between the tubes of the plurality of tubes passageways for a heat-exchange fluid.

8. The heat exchanger according to claim 1, wherein the planar spiral has two opposite major faces, and wherein the at least one first tube, or each tube of the plurality of tubes, has an outer profile having a plurality of reliefs on at least one of the two opposite major faces of the corresponding planar spiral, the reliefs of one tube being locally in contact with at least one adjacent tube of the plurality of tubes, the reliefs operating as spacers for defining between the tubes themselves a passageway for a heat-exchange fluid.

9. The heat exchanger according to claim 1, comprising at least one second manifold member which is outside the tube assembly, and wherein at least the first tube, or each tube of the plurality of tubes, has a second end portion that extends on the outside of the corresponding planar spiral, for connection to the at least one second manifold member.

10. The heat exchanger according to claim 1, comprising a heat-exchanger casing having a gas burner and a fume outlet at respective opposite ends of the heat-exchanger casing,
wherein the tube assembly is housed in the heat-exchanger casing in such a way that the gas burner faces, or projects into, an axial hollow volume defined by the plurality of tubes, at a first axial end of the tube assembly, and the fume outlet faces, or is in fluid communication with, said axial hollow volume at a second axial end of the tube assembly,
and wherein the heat exchanger further comprises at least one fume barrier for fumes produced by the gas burner, the at least one fume barrier being in the tube assembly in an intermediate position between the gas burner and the fume outlet, so as to divide the tube assembly into at least one section upstream and one section downstream relative to the fume barrier, and thereby constrain the fumes to follow an obligate path between the gas burner and the fume outlet, firstly from said axial hollow volume towards the outside of the tube assembly, in the section upstream of the fume barrier, and then from the outside of the tube assembly towards said axial hollow volume, in the section downstream of the fume barrier.

11. The heat exchanger according to claim 10, comprising at least one second manifold member which is outside the tube assembly, and at least the first tube, or each tube of the plurality of tubes, has a second end portion that extends on the outside of the corresponding planar spiral, for connection to the at least one second manifold member, and wherein:
the first manifold member is a delivery manifold and the second manifold member is a return manifold,
the first end portions of the tubes belonging to the section upstream of the fume barrier are connected in parallel to the first manifold member, and the second end portions of the tubes belonging to the section upstream of the fume barrier are connected in parallel to the second manifold member; and
the first end portions of the tubes belonging to the section downstream of the fume barrier are connected in parallel to the second manifold member, and the second end portions of the tubes belonging to the section downstream of the fume barrier are connected in parallel to the first manifold member.

12. The heat exchanger according to claim 10, comprising at least one second manifold member which is outside the tube assembly, and at least the first tube, or each tube of the plurality of tubes, has a second end portion that extends on the outside of the corresponding planar spiral, for connection to the at least one second manifold member, and further comprising a by-pass manifold member, wherein:
the first manifold member is a delivery manifold, and the second manifold member is a return manifold,
the first end portions of the tubes belonging to the section upstream of the fume barrier are connected in parallel to the first manifold member, and the second end portions of the tubes belonging to the section upstream of the fume barrier are connected in parallel to the by-pass manifold member, and
the first end portions of the tubes belonging to the section downstream of the fume barrier are connected in parallel to the second manifold member, and the second end portions of the tubes belonging to the section downstream of the fume barrier are connected in parallel to the by-pass manifold member.

13. A heating device, comprising a heat exchanger according to claim 1.

14. A heat-exchanger tube,
wherein the heat-exchanger tube is wound so as to define a planar spiral having at least one turn,
wherein the tube has a first end portion, which extends starting from the inside of the corresponding planar spiral towards the outside thereof, the first end portion being at least partially superimposed on the at least one turn, in a position corresponding to a major face of the planar spiral,
wherein the tube has at least one transverse depression defined in the at least one turn, in the at least one transverse depression being at least partially received a corresponding part of the first end portion.

15. A method for obtaining a heat-exchanger tube according to claim 14, comprising:
providing a tube;
winding the tube in a spiral that defines at least the first end portion;
inserting a supporting core in the first end portion;

pressing at least part of the first end portion containing the supporting core on the at least one turn, so as to define the at least one transverse depression in which a corresponding part of the first end portion is at least partially received; and removing the supporting core from the first end portion.

16. The heat-exchanger tube according to claim 14, wherein the planar spiral of the tube has a plurality of co-planar turns, which comprise an inner turn and at least one further turn around the inner turn, the first end portion extending from the inner turn, the tube has a plurality of transverse depressions, each defined in a respective turn of the plurality of turns in a position corresponding to said major face of the planar spiral, the transverse depressions being in positions aligned to each other according to a direction of extension of the first end portion, to form thereby a seat in which the first end portion is at least partially received.

17. The heat-exchanger tube according to claim 16, wherein:

said at least one further turn comprises a plurality of further turns, which include an outer turn and one or more intermediate turns between said inner turn and said outer turn.

18. The heat-exchanger tube according to claim 14, wherein the first end portion of the tube comprises a stretch of tube having a profile that is at least in part flattened or planed at least in a position corresponding to one said transverse depression defined in the at least one turn, or in each turn of a plurality of turns of the corresponding planar spiral.

19. The heat-exchanger tube according to claim 14, wherein the at least one turn, or each turn of a plurality of turns of the corresponding planar spiral, comprises a stretch of tube having a profile at least in part flattened or planed at the corresponding transverse depression.

20. The heat-exchanger tube according to claim 14, wherein the planar spiral has two opposite major faces, and the heat-exchanger tube has an outer profile having a plurality of reliefs on at least one of the two opposite major faces of the corresponding planar spiral, the reliefs of the tube being designed to be locally in contact with at least one adjacent tube, the reliefs operating as spacers for defining between the tube and the adjacent tube a passageway for a heat-exchange fluid.

\* \* \* \* \*